(12) United States Patent
Chong

(10) Patent No.: US 10,838,047 B2
(45) Date of Patent: *Nov. 17, 2020

(54) SYSTEMS AND METHODS FOR LIDAR SCANNING OF AN ENVIRONMENT OVER A SWEEP OF WAVELENGTHS

(71) Applicant: SANTEC CORPORATION, Aichi (JP)

(72) Inventor: Changho Chong, Los Altos, CA (US)

(73) Assignee: SANTEC CORPORATION, Komaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/278,582

(22) Filed: Feb. 18, 2019

(65) Prior Publication Data

US 2019/0317199 A1    Oct. 17, 2019

Related U.S. Application Data

(63) Continuation-in-part of application No. 15/954,878, filed on Apr. 17, 2018.

(51) Int. Cl.
| | | |
|---|---|---|
| *G01S 7/4911* | (2020.01) | |
| *G01S 7/481* | (2006.01) | |
| *G01S 17/32* | (2020.01) | |

(52) U.S. Cl.
CPC ........... *G01S 7/4911* (2013.01); *G01S 7/4817* (2013.01); *G01S 17/32* (2013.01)

(58) Field of Classification Search
CPC ....... G01S 7/4911; G01S 17/32; G01S 7/4817
See application file for complete search history.

(56) References Cited

U.S. PATENT DOCUMENTS

| | | |
|---|---|---|
| 4,466,699 A | 8/1984 | Droessler et al. |
| 5,022,745 A | 6/1991 | Zayhowski et al. |
| 5,319,668 A | 6/1994 | Luecke |
| (Continued) | | |

FOREIGN PATENT DOCUMENTS

| | | |
|---|---|---|
| DE | 10 2011 114 797 A1 | 4/2013 |
| JP | 2006-202543 A | 8/2006 |
| (Continued) | | |

OTHER PUBLICATIONS

Aflatouni, et al., "Nanophotonic coherent imager," Optics Express 5118, vol. 23, No. 4, Feb. 23, 2015, DOI:10.1364/OE.23.005117 (9 pages).

(Continued)

*Primary Examiner* — Hwa Andrew Lee
(74) *Attorney, Agent, or Firm* — Foley & Lardner LLP

(57) ABSTRACT

A LIDAR sensing system includes a light source that is controlled to project a collimated beam at various wavelengths. An interferometer receives the collimated beam and projects an object beam corresponding to the collimated beam at a diffraction grating. The object beam is diffracted from the diffraction grating at different angles corresponding to the wavelength of the collimated beam, creating a two dimensional scan along a first axis. The object beam is also controlled along a second axis that is perpendicular to the first axis. As a result, the LIDAR sensing system generates a horizontal and vertical scan (e.g., a three-dimensional scan) of the external environment.

20 Claims, 14 Drawing Sheets

(56) References Cited

U.S. PATENT DOCUMENTS

| | | | |
|---|---|---|---|
| 5,372,135 A | 12/1994 | Mendelson et al. |
| 5,430,574 A | 7/1995 | Tehrani |
| 5,537,162 A | 7/1996 | Hellmuth et al. |
| 5,561,523 A | 10/1996 | Blomberg et al. |
| 5,979,760 A | 11/1999 | Freyman et al. |
| 5,982,963 A | 11/1999 | Feng et al. |
| 6,070,093 A | 5/2000 | Oosta et al. |
| 6,111,645 A | 8/2000 | Tearney et al. |
| 6,134,003 A | 10/2000 | Tearney et al. |
| 6,160,826 A | 12/2000 | Swanson et al. |
| 6,275,718 B1 | 8/2001 | Lempert |
| 6,282,011 B1 | 8/2001 | Tearney et al. |
| 6,373,632 B1 | 4/2002 | Flanders |
| 6,421,164 B2 | 7/2002 | Tearney et al. |
| 6,485,413 B1 | 11/2002 | Boppart et al. |
| 6,501,551 B1 | 12/2002 | Tearney et al. |
| 6,556,853 B1 | 4/2003 | Cabib et al. |
| 6,564,087 B1 | 5/2003 | Pitris et al. |
| 6,725,073 B1 | 4/2004 | Motamedi et al. |
| 7,099,358 B1 | 8/2006 | Chong |
| 7,231,243 B2 | 6/2007 | Tearney et al. |
| 7,323,680 B2 | 1/2008 | Chong |
| 7,324,214 B2 | 1/2008 | De Groot et al. |
| 7,352,783 B2 | 4/2008 | Chong |
| 7,382,809 B2 | 6/2008 | Chong et al. |
| 7,388,891 B2 | 6/2008 | Uehara et al. |
| 7,400,410 B2 | 7/2008 | Baker et al. |
| 7,414,779 B2 | 8/2008 | Huber et al. |
| 7,428,057 B2 | 9/2008 | De Lega et al. |
| 7,489,713 B2 | 2/2009 | Chong et al. |
| 7,701,588 B2 | 4/2010 | Chong |
| 7,725,169 B2 | 5/2010 | Boppart et al. |
| 7,835,010 B2 | 11/2010 | Morosawa et al. |
| 7,865,231 B2 | 1/2011 | Tearney et al. |
| 7,869,057 B2 | 1/2011 | De Groot |
| 7,884,945 B2 | 2/2011 | Srinivasan et al. |
| 7,961,312 B2 | 6/2011 | Lipson et al. |
| 8,036,727 B2 | 10/2011 | Schurman et al. |
| 8,115,934 B2 | 2/2012 | Boppart et al. |
| 8,315,282 B2 | 11/2012 | Huber et al. |
| 8,405,834 B2 | 3/2013 | Srinivasan et al. |
| 8,427,649 B2 | 4/2013 | Hays |
| 8,500,279 B2 | 8/2013 | Everett et al. |
| 8,625,104 B2 | 1/2014 | Izatt et al. |
| 8,690,328 B1 | 4/2014 | Chong |
| 8,690,330 B2 | 4/2014 | Hacker et al. |
| 9,163,930 B2 | 10/2015 | Buckland et al. |
| 9,295,391 B1 | 3/2016 | Tearney et al. |
| 9,335,154 B2 | 5/2016 | Wax et al. |
| 9,851,433 B2 | 12/2017 | Sebastian |
| 2002/0163948 A1 | 11/2002 | Yoshida et al. |
| 2004/0036838 A1 | 2/2004 | Podoleanu et al. |
| 2005/0171438 A1 | 8/2005 | Chen et al. |
| 2005/0201432 A1 | 9/2005 | Uehara et al. |
| 2005/0213103 A1 | 9/2005 | Everett et al. |
| 2006/0105209 A1 | 5/2006 | Thyroff et al. |
| 2006/0109872 A1 | 5/2006 | Sanders |
| 2006/0215713 A1 | 9/2006 | Flanders et al. |
| 2007/0040033 A1 | 2/2007 | Rosenberg |
| 2007/0076217 A1 | 4/2007 | Baker et al. |
| 2007/0081166 A1 | 4/2007 | Brown et al. |
| 2007/0133647 A1 | 6/2007 | Daiber |
| 2007/0141418 A1 | 6/2007 | Ota et al. |
| 2007/0233396 A1* | 10/2007 | Tearney ............... A61B 5/0062 702/19 |
| 2007/0263226 A1 | 11/2007 | Kurtz et al. |
| 2007/0291277 A1 | 12/2007 | Everett et al. |
| 2008/0097194 A1 | 4/2008 | Milner |
| 2008/0269575 A1 | 10/2008 | Iddan |
| 2009/0022181 A1 | 1/2009 | Atkins et al. |
| 2009/0079993 A1 | 3/2009 | Yatagai et al. |
| 2009/0103050 A1 | 4/2009 | Michaels et al. |
| 2009/0169928 A1 | 7/2009 | Nishimura et al. |
| 2009/0247853 A1 | 10/2009 | Debreczeny |
| 2009/0268020 A1 | 10/2009 | Buckland et al. |
| 2009/0290613 A1 | 11/2009 | Zheng et al. |
| 2010/0110171 A1 | 5/2010 | Satake |
| 2010/0157308 A1 | 6/2010 | Xie |
| 2010/0246612 A1 | 9/2010 | Shimizu |
| 2010/0253908 A1 | 10/2010 | Hammer et al. |
| 2010/0284021 A1 | 11/2010 | Hacker |
| 2011/0112385 A1 | 5/2011 | Aalders |
| 2011/0228218 A1 | 9/2011 | Hauger et al. |
| 2011/0235045 A1 | 9/2011 | Koerner |
| 2011/0255054 A1 | 10/2011 | Hacker et al. |
| 2011/0299034 A1 | 12/2011 | Walsh et al. |
| 2012/0013849 A1 | 1/2012 | Podoleanu et al. |
| 2012/0026466 A1 | 2/2012 | Zhou et al. |
| 2012/0133950 A1 | 5/2012 | Suehira et al. |
| 2012/0136259 A1 | 5/2012 | Milner et al. |
| 2012/0188555 A1 | 7/2012 | Izatt et al. |
| 2013/0265545 A1 | 10/2013 | Buckland et al. |
| 2014/0051952 A1 | 2/2014 | Reichgott et al. |
| 2014/0111774 A1 | 4/2014 | Komine |
| 2014/0228681 A1 | 8/2014 | Jia et al. |
| 2014/0268163 A1 | 9/2014 | Milner et al. |
| 2014/0293290 A1 | 10/2014 | Kulkarni |
| 2014/0336479 A1 | 11/2014 | Ando |
| 2015/0223681 A1 | 8/2015 | Kuranov et al. |
| 2015/0348287 A1 | 12/2015 | Yi et al. |
| 2016/0178346 A1 | 6/2016 | Kulkarni |
| 2017/0090031 A1 | 3/2017 | Bondy et al. |
| 2018/0088236 A1 | 3/2018 | Eichenholz et al. |
| 2018/0128594 A1 | 5/2018 | Lee et al. |

FOREIGN PATENT DOCUMENTS

| | | | |
|---|---|---|---|
| JP | 2008-188047 A | 8/2008 |
| JP | 2010-172538 A | 8/2010 |
| JP | 2010-540914 A | 12/2010 |
| WO | WO-2012/075126 A2 | 6/2012 |
| WO | WO-2013/168149 A1 | 11/2013 |
| WO | WO-2015/121756 A2 | 8/2015 |
| WO | WO-2017/176901 A1 | 10/2017 |

OTHER PUBLICATIONS

Hulme, et al., "Fully integrated hybrid silicon free-space beam steering source with 32 channel phased array," Proc. of SPIE vol. 8989 898907-1, 2014 (15 pages).

Poulton, et al., "Coherent solid-state LIDAR with silicon photonic optical phased arrays," vol. 42, No. 20, Oct. 15, 2017, Optics Letters 4091 (6 pages).

International Search Report and Written Opinion in PCT/US2019/027671 dated Jul. 1, 2019.

Lexer, et al., "Wavelength-tuning interferometry of intraocular distances," Applied Optics, 1997, pp. 6548-6553, vol. 36, Issue 25.

Mariampillai, et al., "Speckle Variance Detection of Microvasculature Using Swept-Source Optical Coherence Tomography," Optics Letters, Jul. 2008, pp. 1530-1532, vol. 33 No. 13.

Nankivil, et al., "Handheld, rapidly switchable, anterior/posterior segment swept source optical coherence tomography probe," Biomedical Optics Express, Nov. 2015, pp. 4516-4528, vol. 6, Issue 11.

Ortiz, et al., "Corneal Topography From Spectral Optical Coherence Tomography (sOCT)," Biomedical Optics Express, Dec. 2011, pp. 3232-3247, vol. 2, No. 12.

Poddar, et al., "Non-Invasive Glucose Monitoring Techniques: A Review and Current Trends," Oct. 2008, pp. 1-47.

Sarlet, et al., "Wavelength and Mode Stabilization of Widely Tunable SG-DBR and SSG-DBR Lasers," IEEE Photonics Technology Letters, Nov. 1999, pp. 1351-1353, vol. 11, Issue 11.

Segawa, et al., "Semiconductor Double-Ring-Resonator-Coupled Tunable Laser for Wavelength Routing," IEEE Journal of Quantum Electronics, Jul. 2009, pp. 892-899, vol. 45, Issue 7.

Tayebati, et al., "Microelectromechanical tunable filter with stable half symmetric cavity," Electronics Letters, Oct. 1998, pp. 1967-1968, vol. 34, Issue 20.

Pierrottet, D. et al., "Linear FMCW Laser Radar for Precision Range and Vector Velocity Measurements," MRS Proceedings, 1076-K04-06; doi:10.1557/PROC-1076-K04-06.

(56) References Cited

OTHER PUBLICATIONS

White et al., "In Vivo Dynamic Human Retinal Blood Flow Imaging Using Ultra-High-Speed Spectral Domain Optical Doppler Tomography," Opt. Express 11, 3490-3497 (2003).
Zhao, Y. et al., "Doppler Standard Deviation Imaging for Clinical Monitoring of In Vivo Human Skin Blood Flow," Opt. Lett. 25, 1358-1360 (2000).
Chong, et al. "Large Coherence Length Swept Source for Axial Length Measurement of the Eye," Applied Optics, 2009, pp. D145-D150, vol. 48, Issue 10.
Chopra et al., Topographical Thickness of the Skin in the Human Face, Aesthetic Surgery Journal, vol. 35(8), 2015, pp. 1007-1013.
Chowdhury, et al., "Challenges & Countermeasures in Optical Noninvasive Blood Glucose Detection," International Journal of Innovative Research in Science, Engineering and Technology, Jan. 2013, pp. 329-334, vol. 2, Issue 1.
Dai, et al., "Optical coherence tomography for whole eye segment imaging," Optics Express, Mar. 2012, pp. 6109-6115, vol. 20, Issue 6.
Dhalla, et al., "Simultaneous swept source optical coherence tomography of the anterior segment and retina using coherence revival," Optics Letters, 2012, pp. 1883-1885, vol. 37, No. 11.
Fainman, et al., "Nanophotonics for Information Systems," Information Optics and Photonics, Oct. 1, 2010, pp. 13-37, T. Fournel and B. Javidi eds., Springer New York.
Jeong, et al., "Spectral-domain OCT with dual illumination and interlaced detection for simultaneous anterior segment and retina imaging," Optics Express, Aug. 2012, pp. 19148-19159, vol. 20, Issue 17.
Jia, et al., "Split-Spectrum Amplitude-Decorrelation Angiography with Optical Coherence Tomography," Optics Express, Feb. 2012, pp. 4710-4725, vol. 20 No. 4.

\* cited by examiner

SYSTEMS AND METHODS FOR LIDAR SCANNING OF AN ENVIRONMENT OVER A SWEEP OF WAVELENGTHS

CROSS-REFERENCE TO RELATED APPLICATIONS

This application is a continuation-in-part of U.S. patent application Ser. No. 15/954,878, filed Apr. 17, 2018, the entire disclosure of which is hereby incorporated by reference in its entirety for any and all purposes.

BACKGROUND

The present invention relates generally to the field of sensing and, more specifically, to Light Detection and Ranging (LIDAR) sensing arrangements.

LIDAR systems use light for detecting a distance between a light source and a target. A collimated beam (e.g., a laser) is directed towards the target. LIDAR systems typically identify the time it takes for light to reach the target, be deflected off the target, and return to a detector. Based on this time and the speed of light, a distance to the target is determined. Moreover, Frequency Modulated Continuous Wave (FMCW) radar systems utilize known frequencies of beams to determine whether a measured target is moving. Detection of targets and determinations of movement of the targets are functions that are required to be performed in a reliable, continuous, and timely manner in order for a machine (i.e., an autonomous vehicle) operate safely. Thus, a FMCW LIDAR system capable of continuous and quick detection and monitoring of targets (e.g., objects in the environment) is needed.

SUMMARY

The present technology provides improved LIDAR systems that are capable of capturing more extensive areas of an external environment in a continuous manner.

A LIDAR sensing system includes a light source arranged to project a collimated beam along a path, a beam splitting device, a wavelength dispersive element, a beam directing device, a detector system, and a recombining device. The light source may be one or more tunable lasers. The light source is configured to continuously sweep frequencies of the projected collimated beam from a first frequency (i.e., a first wavelength) to a last frequency (i.e., last wavelength). The beam splitting is arranged in the path between the light source and the wavelength dispersive element. The beam splitting device splits the collimated beam into 1) a reference beam and 2) an object beam that is directed into an external environment of the LIDAR sensing system.

The wavelength dispersive element is arranged along the path of the object beam configured to project the object beam into the external environment at a plurality of diffraction angles relative to a first axis, in a first plane, based on the frequency of the collimated beam. The detector system continuously detects, over the entire continuously swept frequencies from the first frequency to the last frequency, interference patterns generated by the interferometer and corresponding to 1) light reflected off objects located in the external environment and 2) the reference beam. In an embodiment, the recombining device is located along the path between the receiving device and the detector. In alternative embodiments, the recombining device is integrated with the detector. The recombining device is configured to combine a portion of the object beam that was reflected off of an external object and back into the receiving device (or array) with a respective portion of the reference beam. The beam directing device may be used for generating additional scans of the external environment (e.g., scans in a different plane than the first plane). The beam directing device may be arranged along the path of the object beam configured to direct the object beam along a plurality of angles relative to a second axis. The first axis may be perpendicular to the second axis.

In one embodiment, the beam directing device may be a mirror arranged along the path of the optical beam before the wavelength dispersive element, and the beam splitting device may be an interferometer. The mirror may be polygon mirror, a MEMs scanner, or galvanometer mirror that is mechanically and operatively coupled to an actuator that is configured to rotate the mirror. In another embodiment, the beam directing device may include a 1×N optical switch that has an input and a N number of outputs. The input receives (e.g., is optically connected to the light source output) the collimated beam and the 1×N switch selectively outputs the collimated beam to one or more of the N number of outputs, and the N number of outputs may be aligned parallel to the second axis. Further the N number of outputs may be centered on an optical axis of a projection lens that configured to receive the collimated beam from the 1×N switch and refract the collimated beam toward the wavelength dispersive element along the plurality of angles in the second axis.

In another embodiment, the beam directing device may include a 1×N optical coupler (i.e., splitter) that includes an input and a N number of outputs. The input receives (e.g., is optically connected to the light source output) the collimated beam and the 1×N coupler outputs a portion of the collimated beam to each of the N number of outputs, and the N number of outputs may be aligned parallel to the second axis. Further the N number of outputs may be centered on an optical axis of a projection lens that configured to receive the collimated beam from the 1×N switch and refract the object beam toward the wavelength dispersive element along the plurality of angles relative to the second axis. The wavelength dispersive element may include an N number of grating couplers, each one of the N number of grating couplers may receive (e.g., get projected upon) the portion of the collimated beam from one of the N number of outputs. The N number of grating couplers may also be aligned in parallel to the second axis. The wavelength dispersive element may be integrated onto the 1×N optical coupler (i.e., splitter) such that the 1×N optical coupler and the N number of grating couplers are on the same waveguide or chip. In alternative embodiments, the grating couplers may be interchanged with any device that diffracts an incoming beam at an angle unique to the incoming beams frequency.

In an example embodiment, the detector system may include an N number of receiving grating couplers and an N number of detectors. Each of the N number of receiving grating couplers receives light reflected off objects in the external environment and directs the light reflected off objects in the external environment to one of the N number of detectors. Further, there may be an N number of recombining means that correspond to each of the N number of detectors. In alternative embodiments, the grating couplers may be interchanged with any device that diffracts an incoming beam at an angle unique to the incoming beams frequency. In another embodiment, the N number of detectors are each aligned to each receive a portion of the collimated beam via a respective waveguide coupler from the 1×N optical coupler to serve as the reference beam. That is, the 1×N optical coupler may have an extra output from each of the outputs corresponding to a grating coupler and that extra output may be directed (via a waveguide) to the recombining means or one of the N number of detectors to serve as a reference path. The N number of receiving grating couplers may be aligned parallel to the second axis and/or axially-aligned to the second axis. The N number of receiving grating couplers may be aligned parallel to the second axis and/or axially-aligned to the second axis. The N number of receiving grating couplers are aligned parallel to the second axis and/or axially-aligned to the second axis. Further, each of the N number of receiving grating couplers may be aligned to one of the N number of grating couplers along an axis that is parallel to the first axis.

The LIDAR sensing system may also include a projection lens disposed between the wavelength dispersive element and the external environment and configured to refract the collimated beam toward the external environment along the plurality of angles in the second axis. The light source may include, a first tunable laser, a second tunable laser, and a third tunable laser. The first tunable laser having a first tunable spectrum, the second tunable laser having a second tunable spectrum, and the third laser having a third tunable spectrum. The first tunable laser, the second tunable laser, and the third tunable laser may be cascaded together and share an optical output.

In an example method of use the light source is controlled via a controller or computer system to project a swept-frequency collimated beam that is continuously swept from a first frequency to a last frequency, the swept-frequency collimated beam being projected towards a wavelength dispersive element. The beam splitting device may then split the swept-frequency collimated beam into a reference beam and an object beam. The reference beam being directed in a reference path toward the detector and the object beam being directed toward a wavelength dispersive element. The wavelength dispersive element then may diffract the object beam into the external environment at one of multiple diffraction angles according to the frequency of the swept-frequency collimated beam. The object beam may be diffracted from the wavelength dispersive element in a continuously-swept diffraction angle pattern as the frequency of the swept-frequency collimated beam is swept from a first diffraction angle, when the collimated beam is projected at the first frequency, to a last diffraction angle when the collimated beam is projected at the last frequency, wherein the first diffraction angle and the last diffraction angle define a field of view relative to a first axis in a first plane.

The detector, computing device, or frequency counter may then receive reflected object beams from the external environment and calculate, continuously, distances associated with objects located within the field of view based on interference patterns generated based on 1) light corresponding to the object beam being reflected off objects in the external environment and 2) the reference beam.

The foregoing summary is illustrative only and is not intended to be in any way limiting. In addition to the illustrative aspects and features described above, further aspects and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

DETAILED DESCRIPTION

Figure 1:
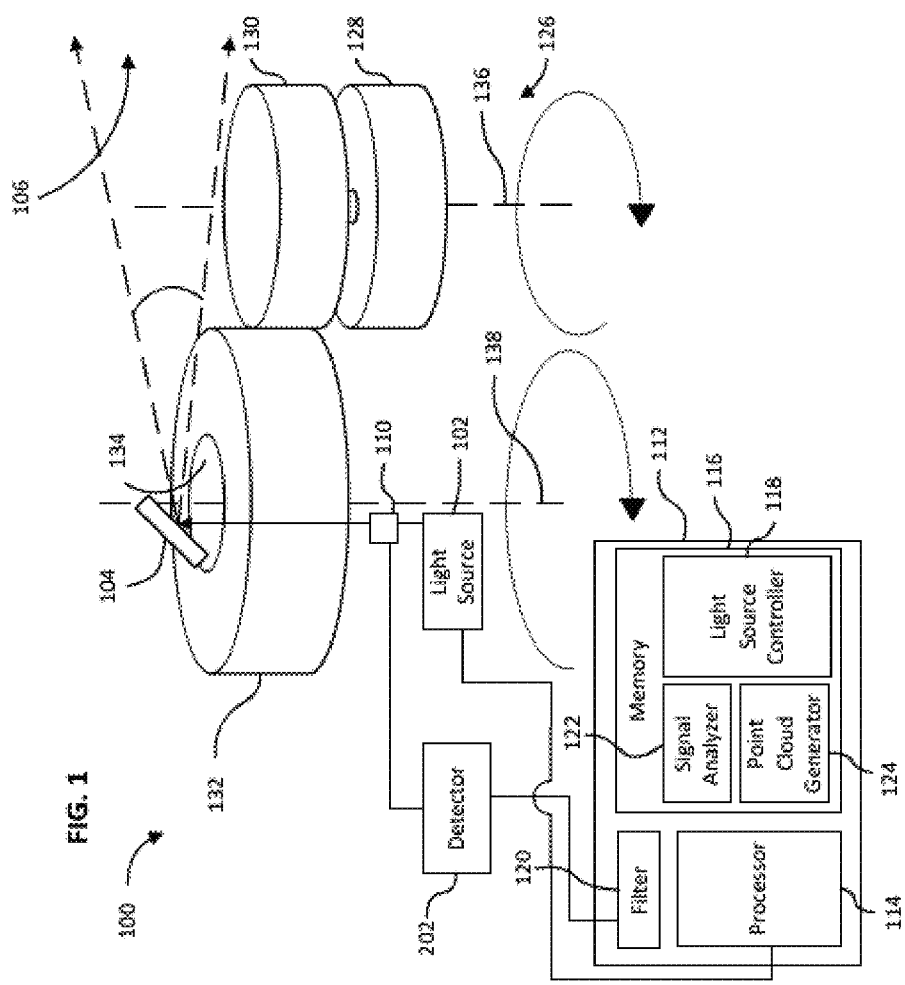
FIG. 1 depicts a LIDAR sensing system in accordance with an illustrative embodiment.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and make part of this disclosure.

Described herein are systems and methods for LIDAR sensing.

As will be discussed in further detail below, a LIDAR sensing system includes a light source that is controlled to project a collimated beam at various wavelengths. An interferometer receives the collimated beam and projects an object beam corresponding to the collimated beam at a diffraction grating. The object beam is diffracted from the diffraction grating at different angles corresponding to the wavelength of the collimated beam. As a result, the LIDAR sensing system generates a vertical scan (e.g., a two-dimensional scan) of the external environment. Various components of the LIDAR sensing system are then configured to rotate to produce multiple vertical scans, thus generating a three-dimensional scan.

Referring to FIG. 1, a LIDAR sensing system 100 is shown. The LIDAR sensing system 100 is shown to include a light source 102. In some implementations, the light source 102 may output a collimated beam (e.g., a laser). Additionally, the light source 102 may be configured for adjustment of a wavelength $\lambda$ of the collimated beam. In this regard, the light source 102 may be a tunable laser where (at least) the wavelength $\lambda$ of the laser is tuned. The light source 102 may be configured for adjustment of the wavelength $\lambda$ of the collimated beam across a range. In some examples, the range of wavelengths $\lambda$ may be between 1.25 μm and 1.35 μm. The light source 102 may be swept across the range of wavelengths $\lambda$, as will be discussed in greater detail below.

In FIG. 1, the LIDAR sensing system 100 is also shown to include diffraction grating 104. While the diffraction grating 104 is included in the LIDAR sensing system 100 of FIG. 1, in some embodiments, the LIDAR sensing system 100 may not necessarily include diffraction grating 104.

The light source 102 may be arranged to project components of the collimated beam onto the diffraction grating 104. For instance, the diffraction grating 104 may be arranged along a path of an object beam corresponding to the collimated beam projected from the light source 102. As will be discussed in greater detail below with respect to FIG. 4, the object beam may be projected onto the diffraction grating 104 at an incident angle $\alpha_0$ (see FIG. 4), and the object beam may be diffracted off the diffraction grating 104 at various diffraction angles $\beta$ corresponding to a wavelength of the collimated beam from the light source 102.

In some examples, light from the object beam reflects off a surface of an object located in an external environment 106 of the LIDAR sensing system 100. The light reflected off the surface of the object may then be detected by the LIDAR sensing system 100 and used for determining a distance to the object.

Figure 2:
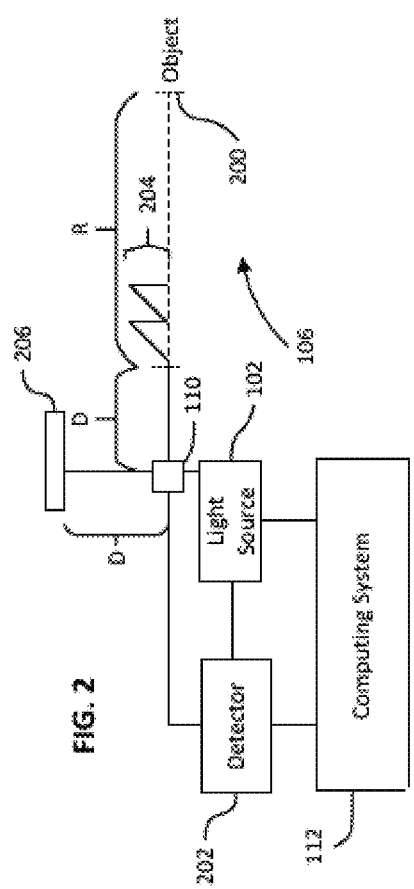
FIG. 2 depicts another LIDAR sensing system, including an object being ranged by the LIDAR sensing system, in accordance with an illustrative embodiment.

Referring now to FIG. 1 and FIG. 2, the LIDAR sensing system 100 may be used to determine a distance to an object 200 in the external environment 106. Specifically, depicted in FIG. 2 is another example of a LIDAR sensing system 100 including an example of the object 200 being ranged using the LIDAR sensing system 100. The LIDAR sensing system 100 is shown to include a detector 202. The detector 202 may be arranged to detect light reflected off the object 200. As will be discussed in greater detail below, in some implementations, the LIDAR sensing system 100 may or may not include diffraction grating 104.

The LIDAR sensing system 100 may include an interferometer 110. The interferometer 110 may be or include components arranged to receive the collimated beam from the light source 102, and split the collimated beam into one or more component beams. For instance, the interferometer 110 may split the collimated beam into an object beam and a reference beam. The object beam may be projected towards the diffraction grating 104, and the reference beam may be projected towards a reference mirror 206. The interferometer 110 may generate an interference pattern based on a difference between light reflected off surfaces of objects in the external environment 106 and light reflected off the reference mirror 206. The LIDAR sensing system 100 may determine a distance to the objects based on the interference pattern.

For instance, the object beam reflected off the object 200 may return to the diffraction grating 104, diffract from the diffraction grating 104 to the interferometer 110, and the detector 202 may detect an interference pattern from the interferometer 110. The detector 202 may generate signals based on the interference pattern. The signals from the detector 202 may be used for determining the distance to the corresponding objects located in the external environment 106.

The LIDAR sensing system 100 may include a computing system 112. The computing system 112 may include a processor 114 and memory 116. The processor 114 may include any component or group of components that are configured to execute, implement, and/or perform any of the processes or functions described herein or any form of instructions to carry out such processes or cause such processes to be performed. In one or more arrangements, the processor 114 may be a main processor of the LIDAR sensing system 100. Examples of suitable processors include microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 114 may include at least one hardware circuit (e.g., an integrated circuit) configured to carry out instructions contained in program code. In arrangements in which there is a plurality of processors, such processors may work independently from each other or one or more processors may work in combination with each other.

The memory 116 may be structured for storing one or more types of data. The memory 116 store may include volatile and/or non-volatile memory. Examples of suitable memory 116 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 116 may be a component of the processor 114, or the memory 116 may be operatively connected to the processor 114 for use thereby. In some arrangements, the memory 116 may be located remotely and accessible by the processor 114, such as via a suitable communications device.

The LIDAR sensing system 100 may include a light source controller 118. The light source controller 118 may be or include computer-readable instructions to control one or more aspects of the light source 102. The light source controller 118 may be stored on memory 116 as shown. In other implementations, the light source controller 118 may be stored remotely and accessible by various components of the LIDAR sensing system 100. The processor 114 may control the light source 102 in accordance with the instructions from the light source controller 118.

The light source controller 118 may include instructions to generate a pattern for the collimated beam projected from the light source 102. For instance, in some implementations, the collimated beam may be projected from the light source 102 in a pattern 204 having a frequency (e.g., pulsed, saw tooth, etc.). The light source controller 118 may include instructions to generate, for example, a saw tooth signal 204 that corresponds to the frequency pattern of the collimated beam projected from the light source 102. As will be discussed in further detail below, the frequency pattern may be used for determining a distance between the object and the LIDAR sensing system 100.

Figure 3:
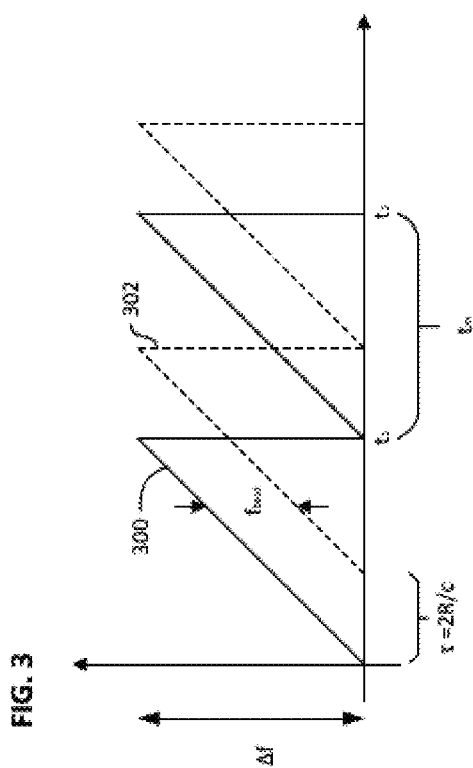
FIG. 3 depicts an example signal profile of the example object ranged in FIG. 2 in accordance with an illustrative embodiment.

Referring now to FIG. 2 and FIG. 3, an example of the object 200 being ranged using the LIDAR sensing system 100 and corresponding signal profile are respectively shown. It should be understood that, while described with reference to FIG. 2 and FIG. 3, the same description may apply to FIG. 1. In the example LIDAR sensing system 100 shown in FIG. 2, the LIDAR sensing system 100 does not include diffraction grating 104. In embodiments such as those shown in FIG. 2, the arrangements described herein can sweep the frequency of the collimated beam, and calculate as the frequency is incrementally changed for the collimated beam.

The signal generated by the detector 202 may correspond to the signal generated by the light source controller 118 and projected via the light source 102 onto the object 102. In some implementations, the light source 102 may be arranged to project the collimated beam both onto the object 200 and the reference mirror 206 (e.g., through the interferometer 110). The reference mirror 206 may be located at a fixed distance D from a point (e.g., from the interferometer 110, for example). The object 200 may be located a distance away that is equal to the sum of the fixed distance D and the range R to the object 200.

When light from the light source 102 is projected in a pattern (e.g., the saw tooth pattern 204 shown in FIG. 2, for example), the interferometer 110 may generate an interference pattern that corresponds to the reference beam reflected off the reference mirror 206 (e.g., reference signal 300) and light which is reflected off the surface of the object 200 (e.g., object signal 302). The detector 202 may detect the interference pattern generated by interferometer 110 and generate signals corresponding to the interference patterns. In some implementations, the signals generated by the detector 202 may be filtered (e.g., by filter 120). Following the signals being generated by the detector 202 (and optional filtering by filter 120), the frequency of the signals may be identified.

Referring now to FIGS. 1-3, in some implementations, the computing system 112 may include a signal analyzer 122. The signal analyzer 122 may be or include instructions to process signals from the detector 202 (following optional filtering by the filter 120) to identify a frequency f of the signals. As one example, the signal analyzer 122 can be or include a frequency counter to calculate, identify, quantify, or otherwise determine a frequency associated with the signals corresponding to the interference patterns. As another example, the signal analyzer 122 may include computer-readable instructions to perform frequency analysis (e.g., fast Fourier analysis) of the interference pattern to identify frequencies of the signals. The signal analyzer 122 may include instructions to identify a range of frequencies $\Delta f$ for each of the respective signals. The signal analyzer 122 may include instructions to identify a time shift $\tau$ between the reference signal 300 and object signal 302. The signal analyzer 122 may include instructions to identify the ramp period $t_m$ for the reference signal 300 and/or object signal 302. The signal analyzer 122 may include instructions to identify a beat frequency $f_{beat}$ at various points in time between the reference signal 300 and object signal 302. Each (or a subset) of these frequency or other characteristics of the respective signals may be used for determining a distance R to the object 200.

The reference signal 300 and object signal 302 are shown in FIG. 3. The reference signal 300 is detected sooner than the object signal 302, as the object 200 is located at a distance (e.g. R) further than the reference mirror 206. The LIDAR sensing system 100 may determine the distance between the object and the point within the LIDAR sensing system 100 based on the comparison of the reference signal 300 and the object signal 302. The LIDAR sensing system 100 may determine the distance according to equation (1):

$$R = \frac{cf_{beat}}{2\left(\frac{\Delta f}{t_m}\right)} \tag{1}$$

where c is the speed of light, $f_{beat}$ is the beat frequency, $\Delta f$ is the range of frequencies, and $t_m$ is the ramp period (e.g., the time between $t_1$ and $t_2$). Where the fixed distance D between the reference mirror 206 and a point in the LIDAR sensing system 100 (e.g., interferometer 110) is known, the distance between the object and the same point is the sum of the fixed distance D and R (as shown in FIG. 2). Accordingly, the distance between a single point on a surface of an object (e.g., object 200) and a point within the LIDAR sensing system 100 may be determined based on the interference pattern corresponding to the reference signal 300 and object signal 302.

In some implementations, the LIDAR sensing system 100 may calculate the distance instantaneously (or substantially instantaneously). In implementations such as these, the LIDAR sensing system 100 may calculate the distance according to equation (2):

$$R = \frac{cf_{beat}}{2\left(\frac{df}{dt_m}\right)} \tag{2}$$

where $$\frac{df}{dt_m}$$

is the instantaneous slope of the frequency ramp, and $dt_m$ is the ramp increment. Implementation such as these can compensate for any nonlinearity of frequency ramp of tunable light source 102, which may increase reliability of the distance calculations.

In some implementations, the LIDAR sensing system 100 may include the interferometer 110 (e.g., a main interferometer) and an auxiliary interferometer. The auxiliary interferometer may be substantially the same as the main interferometer. Additionally, the LIDAR sensing system 100 may include the detector 202 (e.g., a main detector) and an auxiliary detector. The auxiliary detector may be substantially the same as the main detector. The auxiliary interferometer may be arranged to receive the collimated beam from the light source 102. The auxiliary interferometer may split the collimated beam from the light source 102 into two beams, each of which is located at a fixed path length (e.g., a fixed range or distance from the auxiliary interferometer). The auxiliary detector may detect interference patterns from the auxiliary interferometer. In implementations such as these, the interferometer 110 may generate the same interference patterns described above, and the auxiliary interferometer may generate interference patterns corresponding to the fixed path length. The signal analyzer 122 can include instructions for analyzing signals from both the detector 202 and auxiliary detector. The signal analyzer 122 can calculate distances according to equation (3):

$$R = R_o \frac{f_{beat}}{f_{refbeat}} \qquad (3)$$

where $R_o$ is the fixed path length associated with the auxiliary interferometer, $f_{refbeat}$ is the beat frequency from the auxiliary interferometer, and $f_{beat}$ is the beat frequency from the main interferometer (described above). In implementations such as these, the LIDAR sensing system 100 may compensate for any nonlinearity of the light source 102, which may increase accuracy of the distance calculations.

In each of these implementations described above, distances may be calculated on a "rolling" basis as the wavelength of the light source 102 is swept across a range. Further, various arrangements and calculations described above may further increase accuracy of the distance calculations (e.g., through different mathematical calculations, additional interferometers, etc.).

In some embodiments, the LIDAR sensing system 100 may calculate distances at each interval as the wavelength (and therefore frequency) is changed. In these embodiments, the wavelength (and frequency) can be incrementally changed. For instance, the range of wavelengths can be subdivided into a number of increments. At each incremental wavelength, the distance can be calculated (e.g., according to any of the implementations described above, according to time shift or a time difference between receiving an indication of detection of the object beam and reference beam, etc.).

The computing system 112 may include a point cloud generator 124. The point cloud generator 124 may be or include instructions to generate a point cloud from various distance measurements. Point cloud, as used herein, refers to a two or three dimensional representation of an external environment 106 of the LIDAR sensing system 100 based on measured distances to various surfaces detected in the external environment 106. The point cloud generator 124 may include instructions to store each calculated distance and, for instance, an associated coordinate in a coordinate system. Additionally, where the object beam is moved (e.g., mechanically or electromechanically), further distance measurements may be obtained and thereby producing a two-dimensional scan or three-dimensional scan of the external environment 106. At least some of these measurements may be used for forming the point cloud. In some implementations, such as those where at least some components of the LIDAR sensing system 100 are rotated a number of degrees about an axis (e.g., axis 138 of FIG. 1, axis 602 of FIG. 6, etc.), the point cloud may be a 3D point cloud. For instance, where at least some of the components of the LIDAR sensing system 100 are rotated 360° about an axis, the point cloud generator 124 may generate a 360° point cloud. Each of the measured distances and their associated coordinates may be used for forming the point cloud.

Figure 4:
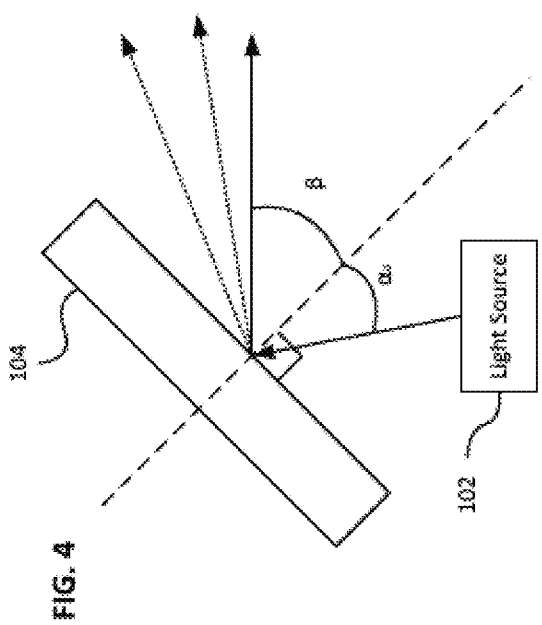
FIG. 4 depicts a detailed view of diffraction grating in the LIDAR sensing system of FIG. 1 in accordance with an illustrative embodiment.

Referring now to FIG. 1 and FIG. 4, the collimated beam projected from the light source 102 may have a wavelength that is swept across a range to change a diffraction angle $\beta$. While described as "swept" herein, it should be understood that the wavelength can be continuously swept, swept at intervals or increments, etc. As shown, light from the light source 102 may be projected onto the diffraction grating 104 (through interferometer 110) at an incident angle $\alpha_0$. In some implementations, the incident angle $\alpha_0$ may be fixed. Accordingly, the relationship between the interferometer 110 and the diffraction grating 104 may be maintained throughout various scans, as will be discussed in greater detail below.

The collimated beam may be projected from the light source 102 at a variable wavelength. For instance, the light source controller 118 may include instructions for changing the wavelength of the collimated beam from the light source 102. As stated above, in some examples, the range of wavelengths $\lambda$ at which the collimated beam from the light source 102 may be swept may be between 1.25 μm and 1.35 μm. As the wavelength $\lambda$ of the collimated beam projected from the light source 102 is swept, the diffraction angle changes. The diffraction angle $\beta$ changes according to equation (4) below:

$$\lambda = d(\sin \alpha_o - \sin \beta) \qquad (4)$$

where the groove frequency d of grating in the diffraction grating 104 is 1200/mm (as one non-limiting example). According to equation (4), as the wavelength $\lambda$ increases, the diffraction angle $\beta$ increases. Continuing the previous example, where the wavelength $\lambda$ is swept from 1.25 μm and 1.35 μm, the diffraction angle $\beta$ changes from 61.3 degrees to 85.9 degrees, or a 24.6 degree field of view along the vertical axis.

In some implementations, the collimated beam projected from the light source 102 may have a linewidth of 1 MHz. In implementations such as these, the coherence length may be 300 m (or a single path range of 150 m). Additionally, the collimated beam projected from the light source 102 may have a range of 1.6 GHz. In these implementations, the resolution may be 9 cm. In each of these implementations, the LIDAR sensing system 100 may satisfy, at least, current standard requirements for LIDAR in many autonomous driving applications (e.g., ranging of 100 m and a resolution of less than 10 cm).

Figure 5:
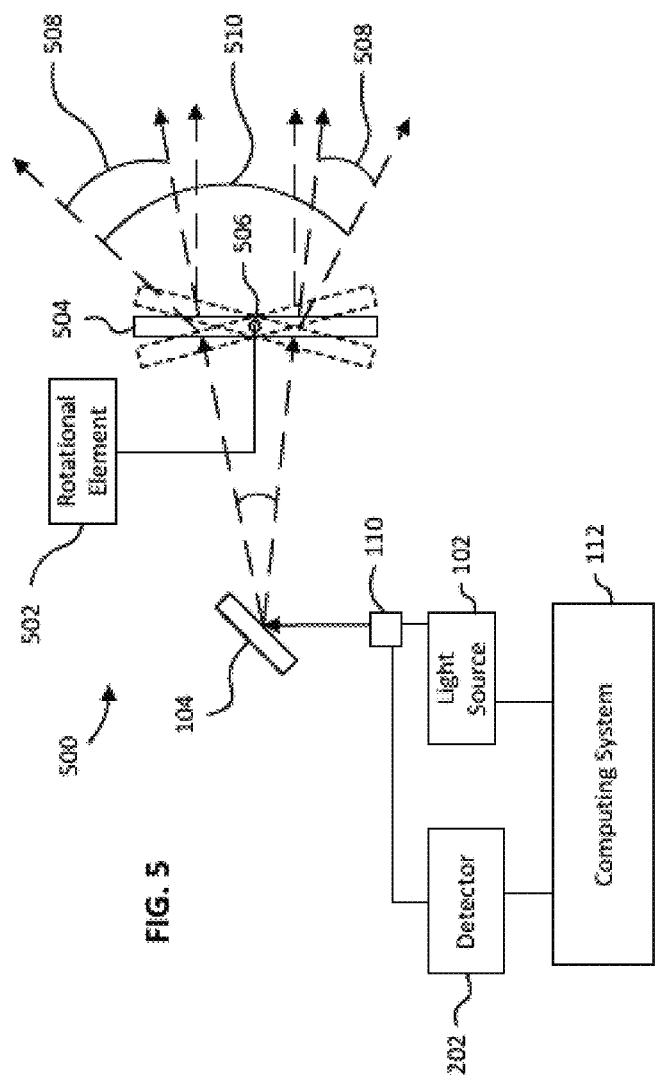
FIG. 5 depicts the LIDAR sensing system of FIG. 1 including a field of view (FOV) expansion system in accordance with an illustrative embodiment.

Referring now to FIG. 5, in some implementations, the LIDAR sensing system 100 may further include components to increase the field of view along an axis. For example, the LIDAR sensing system may include a field of view (FOV) expansion system 500. The FOV expansion system 500 may include a rotational element 502 and a mirror 504. The rotational element 502 may be operatively connected to mirror 504. For instance, the rotational element 502 may be operatively connected to a swivel 506 for the mirror 504. In some implementations, the rotational element 502 may be a micro-electromechanical system (MEMS) driver. In implementations such as these, the diffraction grating 104 may be arranged to diffract the object beam towards the mirror 504. The rotational element 502 may then rotate the mirror 504 to further expand the field of view of the LIDAR sensing system 100 along the axis.

In some embodiments, the rotational element 502 may rotate the mirror 504 a number of degrees along the vertical axis. In so doing, the object beam diffracted from the diffraction grating 104 may be reflected off the mirror 504 at an angular range 508 corresponding to the rotation of the mirror 504. As a result, the field of view 510 of the LIDAR sensing system 100 may be defined by the degree of rotation of the mirror 504 and the change in wavelength of the collimated beam from the light source 102.

As the wavelength of the collimated beam is swept across the range, the LIDAR sensing system 100 may acquire data corresponding to various distances to objects in the external environment 106 (e.g., along the axis). In this regard, the LIDAR sensing system 100 may execute a scan (e.g., a two-dimensional scan) of the external environment 106 along an axis (e.g., the vertical axis of the external environment 106). As will be discussed in greater detail below, where various components of the LIDAR sensing system 100 are rotated, the LIDAR sensing system 100 may generate additional vertical scans. These additional vertical scans may be combined to generate a three-dimensional scan of the external environment 106 (e.g., via the point cloud generator 124). Such a three-dimensional scan may have several practical applications including, but not limited to, object detection and tracking, advanced driving assistance systems, autonomous driving, etc. Additionally, such a three-dimensional scan may be used in other fields outside of vehicle applications including, for instance, generation of three-dimensional maps.

Figure 6:
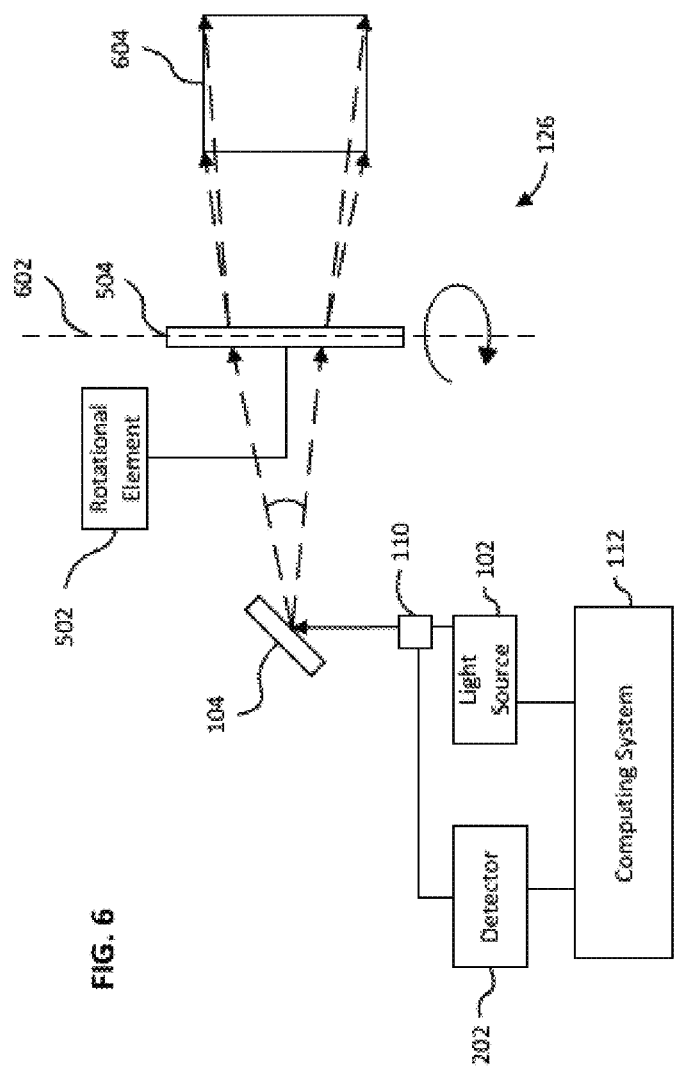
FIG. 6 depicts the LIDAR sensing system of FIG. 1 including an example rotational system in accordance with an illustrative embodiment.

Referring now to FIG. 1 and FIG. 6, according to some embodiments, the LIDAR sensing system 100 may include a rotational system 126. The rotational system 126 may be or include any component or group of components configured to rotate one or more elements of the LIDAR sensing system 100. The rotational system 126 may be used for generating a three-dimensional data and a resulting three-dimensional point cloud of the external environment 106.

As shown in FIG. 1, in some implementations, the rotational system 126 may include a motor 128, one or more rotational drivers 130, and one or more rotary stages 132. In some implementations, the motor 128 may be a DC motor. The motor 128 may be connected to (e.g., via a shaft) the rotational driver 130. The motor 128 may be configured to rotate the rotational driver 130. The rotational driver 130 may be or include one or more gears, pulleys, and/or other components configured to be rotated by the motor 128 and, as a result, rotate the rotary stage 132. The rotary stage 132 may be configured to support (and thereby rotate) one or more elements of the LIDAR sensing system 100. For instance, the rotary stage 132 may support the diffraction grating 104, the FOV expansion system 500 (where included), etc., which may be mounted thereto. In some implementations, the rotary stage 132 may include an aperture 134 to allow the object beam to pass through the rotary stage 132 and onto the diffraction grating 104.

The motor 128 may be configured to rotate about an axis 136 as shown. When the motor 128 rotates about the axis 136, the motor 128 may rotate the rotational driver 130 about another axis. In the example shown, the motor 128 causes the rotational driver 130 to rotate about the same axis 136. However, the motor 128 may cause the rotational driver 130 to rotate along an axis that is different from axis 136. Accordingly, the present disclosure is not limited to the particular arrangement shown in FIG. 1.

When the rotational driver 130 rotates about an axis (for instance, axis 136), the rotational driver 130 may cause the rotary stage 132 to rotate about another axis 138. In some implementations, the rotational driver 130 may cause the rotary stage 132 to rotate a full 360° about the axis 138. In other implementations, the rotation driver 130 may cause the rotary stage 132 to rotate less than (or greater than) the full 360° about the axis 138. As the rotary stage 132 rotates about axis 138, LIDAR sensing system 100 may generate additional scans along the vertical axis (e.g., through controlling the light source 102). Each of these scans may generate distance data associated with various objects located along the vertical axis. The point cloud generator 124 may include instructions to generate a three-dimensional point cloud based on each of these vertical scans.

As shown in FIG. 6, in some implementations, the rotational system 126 may include a rotational element 502 and mirror 504. The rotational element 502 and mirror 504 may be similar to those described above with reference to FIG. 5. In some implementations, the LIDAR sensing system 100 may include both the FOV expansion system 500 and rotational system 126, in which case the LIDAR sensing system 100 includes two rotational elements 502 and two mirrors 504.

Where the rotational system 126 includes the rotational element 502 and mirror 504, the rotational element 502 may be arranged to rotate the mirror 504 about axis 602 (e.g., an axis 602 parallel to the vertical axis). The mirror 504 may be rotated about the axis 602, and subsequent vertical scans may be generated of the external environment 106 (e.g., shown by box 604). Each of these vertical scans may be used to generate a point cloud, as described above.

Figure 7:
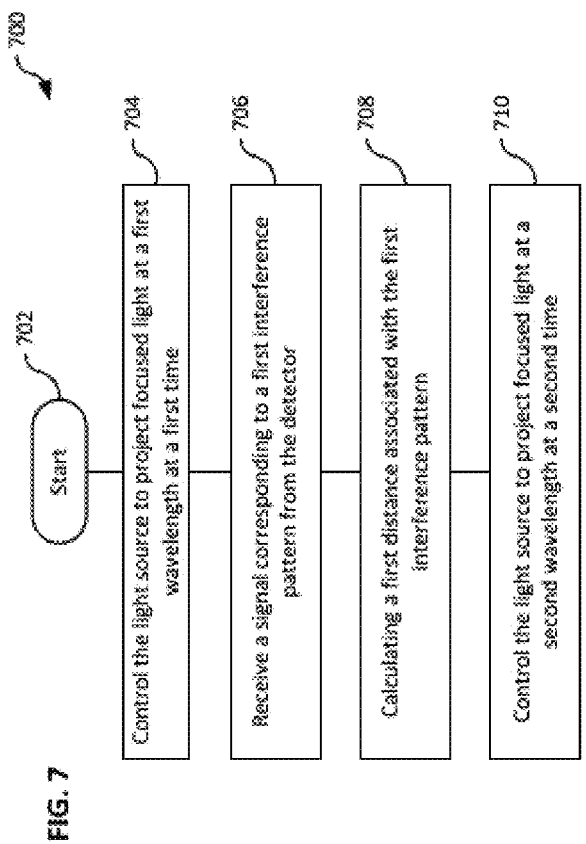
FIG. 7 depicts a flow chart showing an example method of LIDAR sensing in accordance with an illustrative embodiment.

Now that various aspects of the disclosed systems and components have been described, a method of LIDAR scanning will be described with reference to FIG. 7. The flow chart shown in FIG. 7 provides only one example of LIDAR scanning. Accordingly, the following disclosure should not be limited to each and every function block shown in FIG. 7. To the contrary, the method does not require each and every function block shown in FIG. 7. In some examples, the method may include additional function blocks. Further, the method does not need to be performed in the same chronological order shown in FIG. 7.

Referring now to FIG. 7, a flow chart is shown to depict an example method 700 of LIDAR scanning is shown.

At operation 702, the method 700 may begin. For example, the method 700 may begin when an initialization signal (e.g., from a user) is received by the various components/systems described herein. As another example, the method 700 may begin when a vehicle is started (e.g., when the LIDAR sensing system 100 is a component of the vehicle). The method 700 may proceed to operation 704.

At operation 704, the method 700 may include controlling the light source 102 to project the collimated beam at a first wavelength at a first time. The collimated beam may be split by interferometer 110 into the object beam and reference beam. The object beam may be projected onto the diffraction grating 104. In some implementations, the processor 114 may control the light source 102 in accordance with the instructions from the light source controller 118. The object beam may be diffracted from the diffraction grating 104 at a first diffraction angle $\beta$. The object beam may be diffracted from the diffraction grating 104 at the first diffraction angle $\beta$ in accordance with the wavelength of the collimated beam. The method 700 may proceed to operation 706.

In some implementations, while the light source 102 projects the collimated beam at the first wavelength, the method 700 may further include generating one or more control signals FOV expansion system 500 to control the rotational element 502 to rotate the mirror 504 in a first direction. In implementations such as these, the collimated beam may be reflected off the mirror 504 into the external environment 106 at a first angular range 508 corresponding to a degree of rotation of the mirror 504. In implementations where the mirror 504 is rotated in the first direction, the field of view for the LIDAR sensing system 100 may be defined by the first and second diffraction angle and the first angular range 508.

At operation 706, the method 700 may include receiving a signal corresponding to a first interference pattern from the detector 202. The interferometer 110 may generate the first interference pattern based on light reflected off objects in the external environment 106 and the reference mirror 206. The detector 202 may detect the interference pattern, and may generate a signal corresponding to the interference pattern. The first interference pattern may be associated with the collimated beam projected at operation 704. The method 700 may proceed to operation 708.

At operation 708, the method 700 may include calculating a first distance associated with the first interference pattern from operation 706. The signal analyzer 122 can include instructions for calculating the first distance (e.g., via any of equations 1-3). The signal analyzer 122 can include instructions for analyzing the signal from function block 706 to determine various signal characteristics (e.g., frequency, temporal, or other characteristics). The signal analyzer 122 can include instructions for calculating the first distance based on various characteristics of the analyzed signal. The method 700 may proceed to operation 710.

At operation 710, the method 700 may include controlling the light source 102 to project the collimated beam at a second wavelength at a second time. Operation 710 may be similar to operation 704. However, the second wavelength may be different from the first wavelength. Accordingly, the object beam may be diffracted from the diffraction grating 104 at a second diffraction angle β different from the first diffraction angle β. The object beam may be diffracted from the diffraction grating 104 at the second diffraction angle β in accordance with the wavelength of the collimated beam.

The method 700 may include calculating additional distances in substantially the same manner as described above with reference to operation 708. In this regard, the method 700 may include calculating distances associated with various objects located along the axis in the external environment 106. The distances may be calculated based on interference patterns generated by the interferometer 110 and detected by the detector 202. The distances may be calculated on a "rolling" basis. For instance, as the light source 102 is controlled to sweep the collimated beam across a range of wavelengths, the method 700 may include calculating distances as the collimated beam is swept across the range of wavelengths.

In some implementations, while the light source 102 projects the collimated beam at the second wavelength, the method 700 may further include generating one or more control signals for the FOV expansion system 500 to control the rotational element 502 to rotate the mirror 504 in a second direction. In implementations such as these, the object beam may be reflected off the mirror 504 into the external environment 106 at a second angular range 508 corresponding to a degree of rotation of the mirror 504. In implementations where the mirror 504 is rotated in the second direction, the field of view for the LIDAR sensing system 100 may be defined by the first and second diffraction angle and the second angular range 508. Additionally, where the mirror 504 is rotated in both the first direction while the light source 102 projects the collimated beam at the first wavelength the second direction while the light source 102 projects the collimated beam at the second wavelength, the field of view for the LIDAR sensing system 100 may be defined by the first and second diffraction angle and the first and second angular range 508.

In some implementations, following execution of the operations 702 through 710 to generate a first scan along an axis (e.g., a vertical axis) at a first position, the method 700 may further include generating one or more control signals for the rotational system 126 to one or more components of the LIDAR sensing system 100 about another axis to a second position. In implementations such as these, the method 700 may further include generating a second scan (and additional scans) of adjacent portions of the external environment 106 (e.g., through executing operations 702 through 710 when the rotary stage 132 is located at the second position).

In some implementations, the method 700 may include generating a point cloud map based on distances (including the first distance calculated at operation 708). The point cloud map may be a 360° point cloud map. For instance, the point cloud map may be a 360° point cloud map when the rotary stage is rotated 360° about the second axis.

As will be discussed in further detail below, a LIDAR sensing system includes a light source that is controlled to project a collimated beam over various wavelengths. An interferometer receives the collimated beam and projects an object beam corresponding to the collimated beam at a diffraction grating. The object beam is diffracted from the diffraction grating at different angles corresponding to the wavelength of the collimated beam. As a result, the LIDAR sensing system generates a scan along the first axis (e.g., a horizontal scan) of the external environment in a first plane. Various components of the LIDAR sensing system are then configured to produce a variety of horizontal scans (e.g., multiple planes), thus generating a three-dimensional scan. Other systems have required the use of frequency modulators to measure single points of distance in a field of view, which restricts the efficiency of the system. In such systems, a frequency modulation for each point in the field of view was performed in order to calculate the distance of that point. Thus, such systems were undesirable in applications (e.g., autonomous vehicles) that depend on continuous and quick scans of the external environment. The unique system described herein allows for a continuous sweep of frequencies from the light source to generate a scan over an entire field of view while also continuously calculating the distance of each point throughout the sweep. This decreases the amount of time needed to scan an exterior environment and is thus more desirable in applications such as autonomous vehicles.

Figure 8:
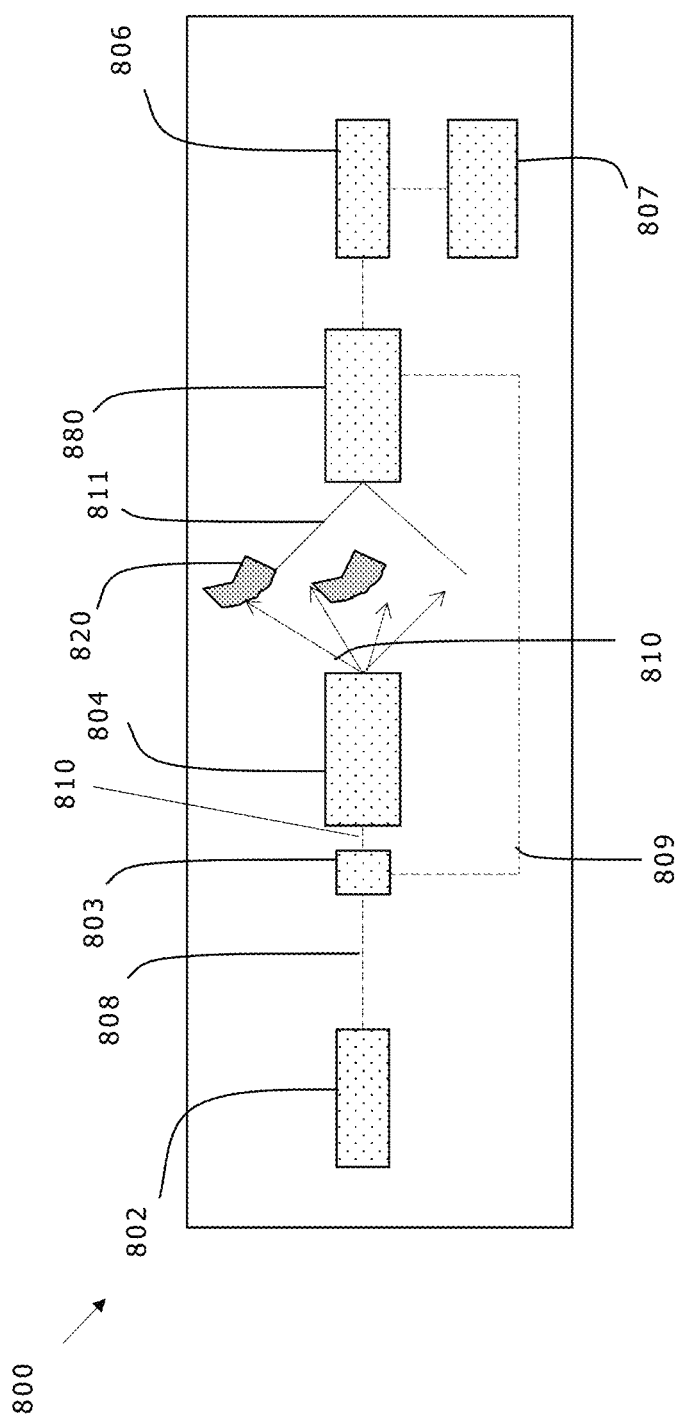
FIG. 8 depicts a block diagram of a LIDAR sensing system in accordance with an illustrative embodiment.

FIG. 8 depicts a block diagram of a LIDAR sensing system 800 in accordance with an illustrative embodiment. The LIDAR sensing system 800 includes a light source 802. In some implementations, the light source 802 may output a collimated beam (e.g., a laser). Additionally, the light source 802 may be configured for adjustment of a wavelength λ (and its corresponding frequency) of the collimated beam. In this regard, the light source 802 may be a tunable laser where (at least) the wavelength λ of the laser is tuned. The light source 802 may be configured for adjustment of the wavelength λ of the collimated beam across a range from a first wavelength λ1 to a last wavelength λ2. The light source 802 may be swept across the range of wavelengths k, as will be discussed in greater detail below. In an embodiment, a number of tunable lasers may be cascaded in order to achieve a greater wavelength λ bandwidth. In an embodiment, the light source 802 may be an extended cavity laser, tunable VCSEL, or other variation thereof. In another embodiment, the light sources 102 may include multiple tunable lasers, or tunable VCSELs.

The LIDAR system 800 also includes a beam splitting device 803, a beam steering device 804, an optical aperture (not depicted), a detector 806, a computing device 807, and a recombining device 880. The beam splitting device 803 may be an interferometer, a waveguide coupler, or other beam splitting component, depending upon the application. In alternative embodiments, the beam splitting device 803 may be integrated with the beam steering device 804. The beam splitting device 803 is designed to split an incoming beam 808 from the light source 802 and split the incoming beam 808 into a reference beam 809 and an object beam 810. The object beam 810 is then projected toward the beam steering device 804 that steers the object beam 810 through a plurality of angles into an area external to the LIDAR system 800. In an embodiment, the beam steering device 804 includes a wavelength dispersive element that allows for scanning along a first axis, and a beam directing device that allows for scanning along a second, perpendicular axis. The area external to the LIDAR system 800 may include an object(s) 820 that the object beam 810 impinges on and reflects from. The reflected object beam 811 then re-enters the LIDAR system through the optical aperture and is projected toward the detector 806. The reference beam 809 is recombined with the reflected object beam 811 either at the optical aperture, at the detector 806, or a spot before the detector 806. The re-combination of the reflected object beam 811 and the reference beam 809 creates an interference beam 812.

The interference beam 812 is received by the detector 806. The detector 806 may be any sensor that is known in the art to receive optical beams. The detector 806 outputs the sensed interference beam 812 to the computing device 807. The computing device 807 may include a processor and memory. The processor may include any component or group of components that are configured to execute, implement, and/or perform any of the processes or functions described herein or any form of instructions to carry out such processes or cause such processes to be performed. In one or more arrangements, the processor may be a main processor of the LIDAR sensing system 800. Examples of suitable processors include microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor may include at least one hardware circuit (e.g., an integrated circuit) configured to carry out instructions contained in program code. In arrangements in which there is a plurality of processors, such processors may work independently from each other or one or more processors may work in combination with each other.

The memory may be structured for storing one or more types of data. The memory store may include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory may be a component of the processor, or the memory may be operatively connected to the processor for use thereby. In some arrangements, the memory may be located remotely and accessible by the processor, such as via a suitable communications device.

In alternative embodiments, the computing device 807 may also be connected to the beam the beam splitting device 803, beam steering device 804, optical aperture 805, and/or the detector 806. In an embodiment, the computing system 807 includes a signal analyzer. The signal analyzer may be or include instructions to process signals from the detector 806 to identify a frequency f of the interference beam 812. As one example, the signal analyzer can be or include a frequency counter to calculate, identify, quantify, and/or otherwise determine a frequency associated with the signals corresponding to the interference patterns. As another example, the signal analyzer may include computer-readable instructions to perform frequency analysis (e.g., fast Fourier analysis) of the interference pattern to identify frequencies of the signals. The signal analyzer may include instructions to identify a range of frequencies Δf for each of the respective signals. The signal analyzer may include instructions to identify a time shift τ between the reference beam 809 and reflected object beam 811. The signal analyzer may include instructions to identify the ramp period $t_m$ for the reference signal and/or object signal. The signal analyzer may include instructions to identify a beat frequency $f_{beat}$ at various points in time between the reference signal and object signal. The beat frequency may be identified using a frequency counter. The frequency counter may be integrated with the computing device or, in other embodiments, be a separate device. Each (or a subset) of these frequency or other characteristics of the respective signals may be used for determining a distance R to the object. That is, the computing device 807 and/or signal analyzer may dissect the received interference beam and determine the distance of the object(s) 820 from the LIDAR system based on timing of the beams, and may determine the speed or movement of the object(s) 820 relative to the LIDAR system via the frequency changes of the beams as they travel through (e.g., out of and into) the LIDAR system 810.

The computing device 807 may include a point cloud generator. The point cloud generator may be or include instructions to generate a point cloud from various distance measurements. Point cloud, as used herein, refers to a two or three dimensional representation of an external environment of the LIDAR sensing system 800 based on measured distances to various surfaces detected in the external environment. The point cloud generator may include instructions to store each calculated distance and, for instance, an associated coordinate in a coordinate system. Additionally, where the object beam is moved (e.g., mechanically or electromechanically), further distance measurements may be obtained and thereby producing a two-dimensional scan or three-dimensional scan of the external environment. At least some of these measurements may be used for forming the point cloud. In some implementations, such as those where at least some components of the LIDAR sensing system 800 are rotated a number of degrees about an axis the point cloud may be a 3D point cloud. For instance, where at least some of the components of the LIDAR sensing system 800 are rotated 360° about an axis, the point cloud generator may generate a 360° point cloud. Each of the measured distances and their associated coordinates may be used for forming the point cloud.

The computing device 807 may continuously calculate the distance of an object in the field of view. For example, as the light source 802 sweeps from a first wavelength to a last wavelength continuously in a linear fashion, for example when wavelength is tuned from 1.25 micrometers (e.g., the first wavelength) to 1.36 micro meters (e.g., the last wavelength) the beam for a specific LIDAR system (such as the example embodiments below) an object beam is deflected by about 25 degrees relative to the first axis. Throughout the continuous sweep of the 25 degrees, a 0.01 degree change corresponds to about a 1.7 centimeter change at distance of 100 meters from the LIDAR sensing system. However, a normal collimated beam (e.g., object beam with divergence of about 0.4 milla-radians) will have about an 8 centimeter diameter of beam at an object 100 meters away. Thus, a 0.01 degree change of the object beam can be considered stationary so if the wavelength is adjusted continuously from the sweep from the first wavelength to the last wavelength, then the computer can use increments of 0.01 nm to calculate any objects frequency modulation with a resolution of about 9 centimeters. Thus, in an example, the LIDAR systems herein can achieve continuous sweep of a wide tuning range of about 100 nanometers to achieve a 25 degree angular sweep on the first axis while simultaneously calculating a frequency modulated control wave (e.g., beat frequency). As a result, continuous computations of range (e.g., distance of the object from the system) can be done. This may significantly improve the latency time of calculations.

Figure 9:
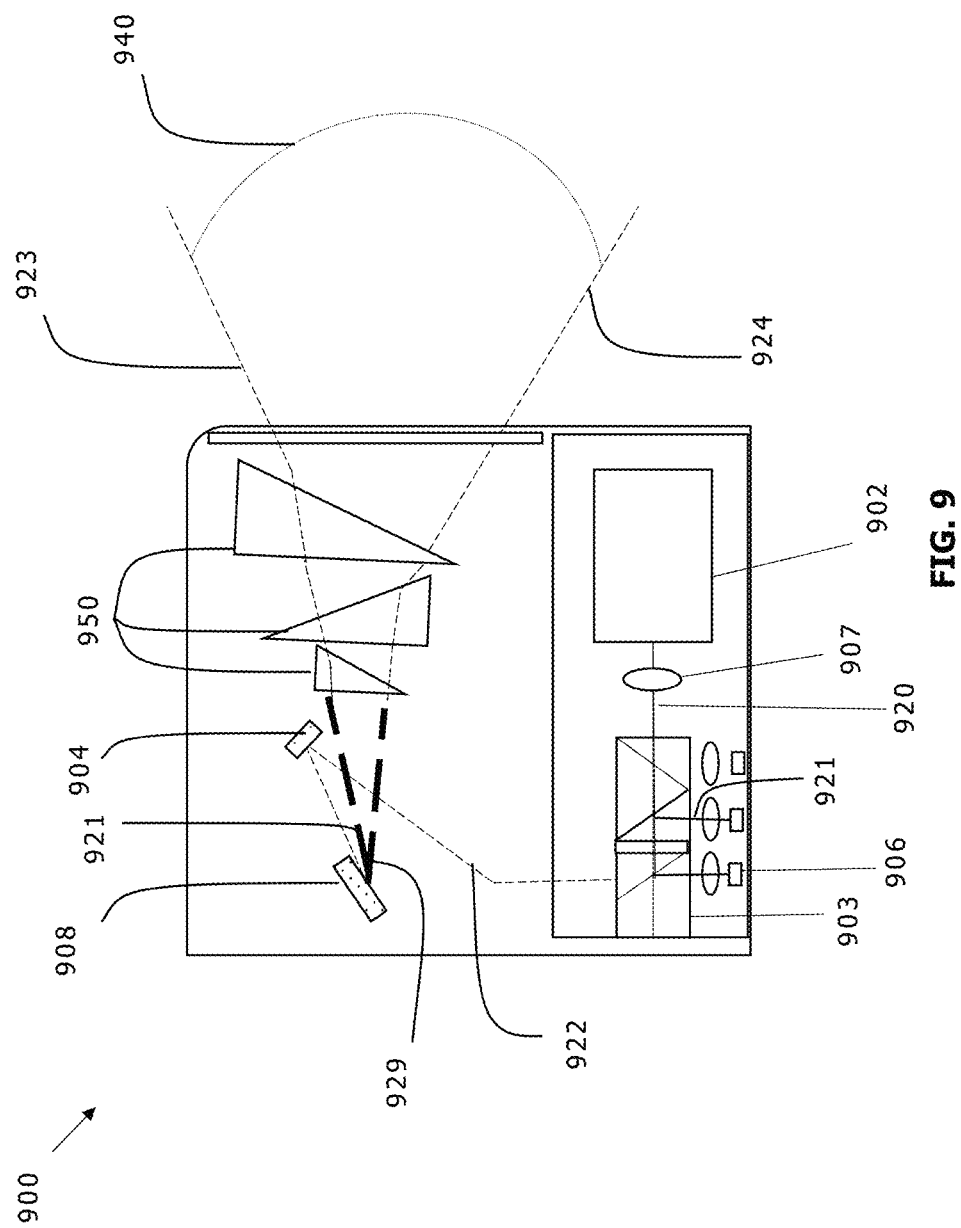
FIG. 9 depicts a first example of LIDAR sensing system in accordance with an illustrative embodiment.

FIG. 9 depicts a first example of a LIDAR sensing system 900 in accordance with an illustrative embodiment. The first example of a LIDAR sensing system 900 includes a light source 902, a beam splitting device 903, a beam directing device 904, an optical aperture 905, a detector 906, a collimated lens 907, a wavelength dispersive element 908, and a computing device (not depicted). The light source 902 projects an optical beam 920 through the collimated lens 907. The collimated lens 907 is optically aligned with the input of the beam splitting device 903. In an embodiment, the beam splitting device 903 is an interferometer that splits the optical beam 920 into a reference beam 921 and an object beam 922. The object beam 922 is optically aligned with the beam directing device 904. In this example, the beam directing device 904 is a rotatable mirror. The rotatable mirror is configured to direct the incoming object beam 922 onto the wavelength dispersive element 908. That is, the rotatable mirror is located optically before the wavelength dispersive element 908 along the path of the optical beam. In alternative embodiments, the rotatable mirror may be located optically beyond the wavelength dispersive element 908 (e.g., after the wavelength dispersive element). The wavelength dispersive element 908 may be any device that directs or reflects an incoming beam of light along an angle that is unique to the incoming beams frequency. For example, the wavelength dispersive element 908 may be a diffraction grating, grating coupler, etc.

The wavelength dispersive element 908 then diffracts the incoming object beam 922 along an angle that is unique to the frequency of the incoming object beam 922. For example, the object beam 922 may have a first frequency that represents an extreme low frequency (e.g., the lowest frequency the optical source can output) and the wavelength dispersive element 908 will diffract the optical beam along a first angle 921 on a first axis that defines a first extreme 923 for a field of view 940. Similarly, the object beam 922 may have a last frequency that represents an extreme high frequency (e.g., the highest frequency the optical source can output) and the wavelength dispersive element 908 will diffract the optical beam along a second (e.g., a last) angle 929 along the first axis that defines a second extreme 924 for the field of view 940. A projection device 950 may amplify the angles diffracted from the wavelength dispersive element 908 in order to expand the field of view 940 in the first axis. In an embodiment, the projection device 950 may be a projection lens, a series of prisms, a focusing lens, a diverging lens, a cylindrical lens, a curved mirror, a series of mirrors or any combination thereof. In this way, when the light source 902 is swept from the lowest frequency to the highest frequency, a portion of the output optical beam 922 will impinge upon any object within the field of view along the first axis. The reflected light from the object will then travel through the same path back through the LIDAR system 900 and be received by the detector 906.

In summary, the light source 902 sweeps continuously from the extreme low frequency to the extreme high frequency (or vice versa). At each particular frequency, the object beam 920 is directed out of the LIDAR system at a unique angle that corresponds the frequency. Thus, the object beam 920 scans the area outside of the LIDAR system continuously from a first extreme angle 923 to a last extreme angle 924 in a first plane. The first extreme angle 923 and the last extreme angle 924 define the field of view 940 along the first axis (e.g., vertical axis). After the light source 902 completes the first sweep, the rotatable mirror 904 may then be actuated (e.g., rotated or moved) to project the object beam 920 at a different angle to the wavelength dispersive element 908. The result of this is that the object beam 920 is then diffracted at a different angle along a second axis (e.g., horizontal axis), the second axis being perpendicular to the first axis. In this way, the light source 902 can re-sweep continuously from the extreme low frequency to the extreme high frequency (or vice versa) in order to determine the distance and location of objects within the field of view. That is, the rotation of the rotatable mirror 904 allows for the area outside of the LIDAR system to be imaged in two-dimensions and the received light allows the computing device (not depicted) to create a three-dimensional image of the external environment.

Figure 10:
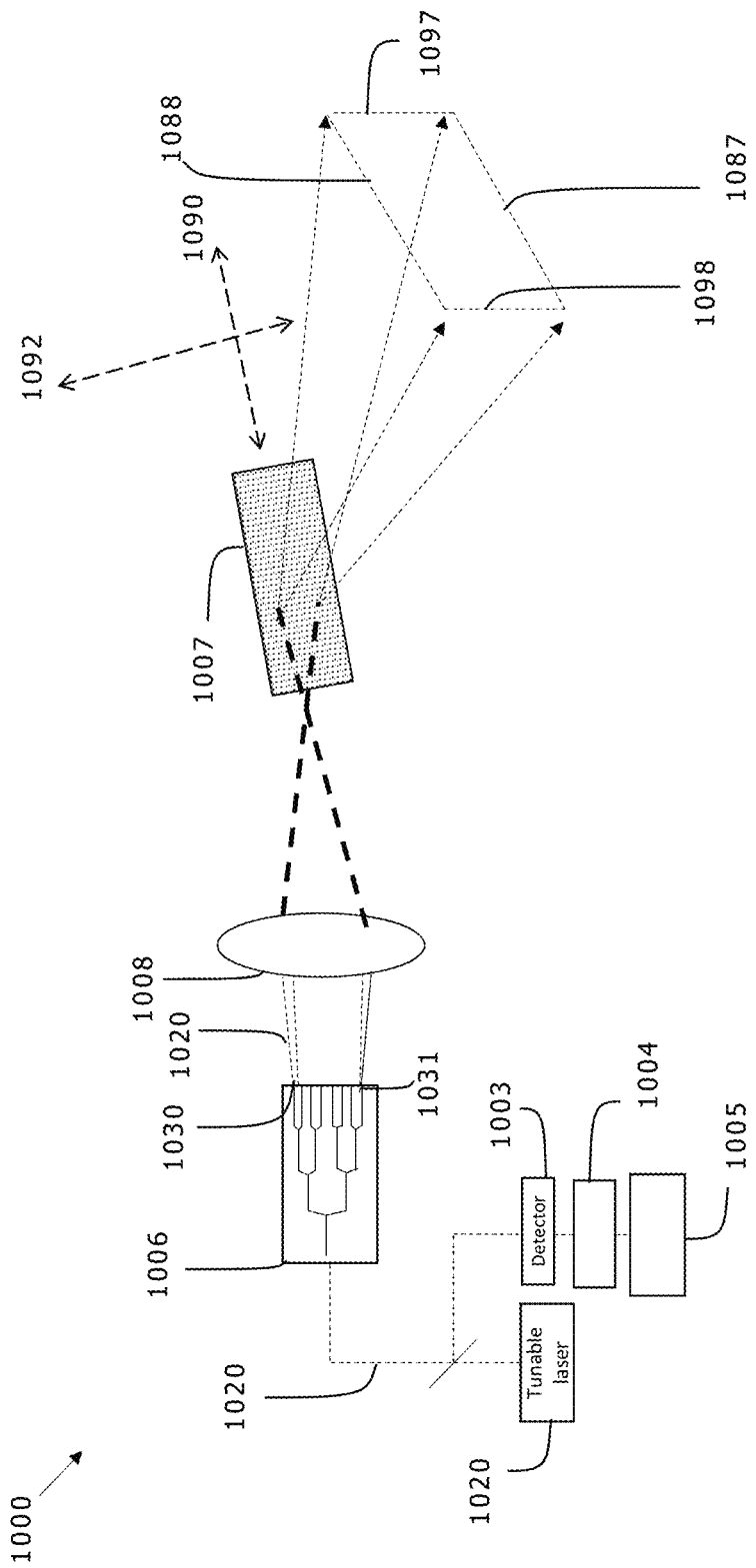
FIG. 10 depicts a second example of LIDAR sensing system in accordance with an illustrative embodiment.

FIG. 10 depicts a portion of second example of LIDAR sensing system 1000 in accordance with an illustrative embodiment. The second example of LIDAR sensing system 1000 includes a light source 1002, a detector 1003, a filter 1004, a computing device 1005, a beam directing device 1006, a wavelength dispersive element 1007, and a projection device 1008. The LIDAR system may also include a beam splitting device (not depicted) and a reference beam path (not depicted). In an example, the light source 1002 is a tunable laser. In an embodiment, the beam directing device 1006 may be a 1×N switch. In another embodiment, the beam directing device 1006 may be a 1×N splitter. The 1×N switch or the 1×N splitter each have one input and an N number of outputs. The 1×N switch may selectively choose which output it is directing the input to and out of. The 1×N splitter may split an incoming beam N number of times and project a portion of the incoming beam from each output.

In an example, the light source 1002 projects a sweeping object beam 1020 that sweeps from a first wavelength to a last wavelength. The object beam 1020 is directed into the beam directing device 1006 and through the projection device 1008. The projection device 1008 may amplify the incoming beams angles to reach a wider or longer field of view. In an example, the projection device may be a focusing lens. The object beam 1020 then impinges upon the wavelength dispersive element 1007. The wavelength dispersive element 1007 then diffracts the object beam 1020 along an angle in a first axis 1090 depending upon the object beams frequency. The beam directing device 1006 and projection device 1008 directs the object beam along an angle in a second axis 1092 depending upon which output of the 1×N switch is being output. For example, the first wavelength projected by the light source 1002 projects the object beam 1020 along a first extreme angle 1097 in the first axis 1090. The last wavelength projected by the light source 1002 projects the object beam 1020 along a second extreme angle 1098 in the first axis 1090. Further, an output of the object beam 1020 from a first extreme 1030 of the N number of outputs directs the object beam (over all wavelengths) 1020 along a first extreme angle 1087 in the second axis 1092. An output of the object beam 1020 from a second extreme 1031 of the N number of outputs directs the object beam (over all wavelengths) 1020 along a second extreme angle 1088 in the second axis 1092. The first and second extreme angles of the first axis 1090 and the first and second extreme angles of the second axis 1092 define the field of view. In this way, any object located in the field of view 1051 can be accurately measured (e.g., it can be mapped, the distance can be calculated, and any motion can be calculated via the computing device 1005) after a reflected object beam (not depicted) is directed back to the detector 1003.

Figure 11:
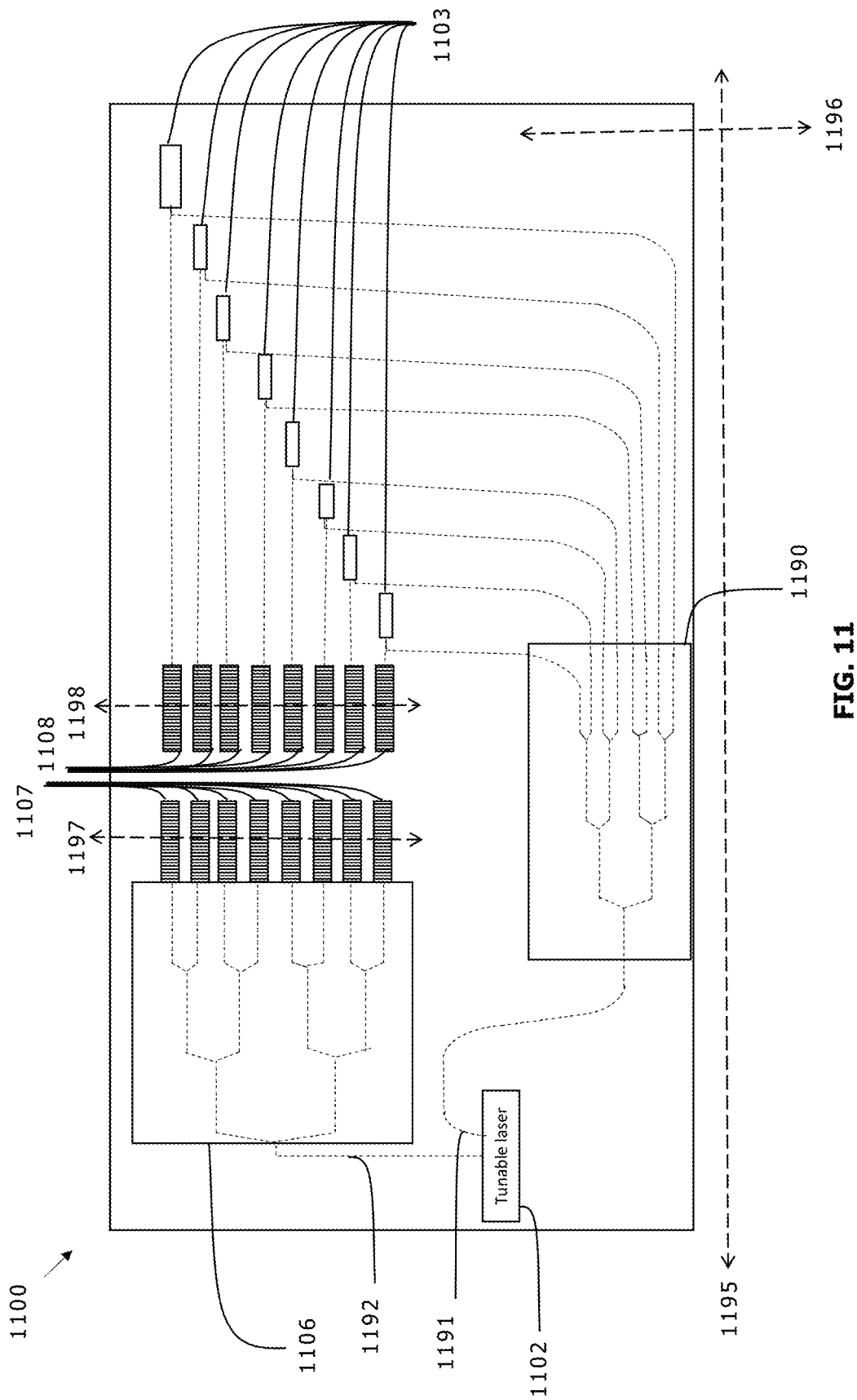
FIG. 11 depicts a third example of LIDAR sensing system in accordance with an illustrative embodiment.

FIG. 11 depicts a third example of LIDAR sensing system 1100 in accordance with an illustrative embodiment. The third example of LIDAR sensing system 1100 includes a light source 1102, a detector array 1103, a computing device (not depicted), a beam directing device 1106, a wavelength dispersive element 1107, and a receiving array 1108. The beam directing device 1106 may be a first 1×N splitter. The wavelength dispersive element 1107 includes a plurality of grating couplers. In alternative embodiments, a plurality of diffraction grating or other similar dispersive means may be used. The plurality of grating couplers (e.g., wavelength dispersive element 1107) may be integrated with the 1×N splitter (i.e., beam directing device 1106). The receiving array 1108 includes a plurality of grating couplers that are each connected to one of the detectors of the detector array 1103. The LIDAR sensing system 1100 may also include a second 1×N splitter 1190 that is configured to receive a first portion of an output beam 1191 and split the first portion of the output beam 1191 into an N number of reference beams. Each of the N number of reference beams are directed toward one of the detectors of the detector array 1103. In alternative embodiments, the first 1×N splitter may include an extra output for each grating coupler of the wavelength dispersive element 1107. Each of the extra outputs may be directed toward one of the detectors of the detector array 1103 to serve as a reference beam.

The LIDAR system 1100 may also include a projection device (not depicted) that expands the angles of beams projected from the wavelength dispersive element (i.e., the plurality of grating couplers. The first portion of the output beam 1191 of the light source 1102 may be directed to a second 1×N splitter 1190 that divides the first portion 1191 into an N number of reference beams and directs each of the N number of reference beams toward one of the detectors of the detector array 1130. A second portion of the output beam 1192 may then be directed to an input of the first 1×N splitter (i.e., beam directing device 1106). The beam directing device 1106 via the first 1×N splitter may then divide the first portion of the output beam 1192 in an N number of object beams. Each of the N number of objects beams then are directed toward one of the plurality of grating couplers (i.e., wavelength dispersive element 1107). The plurality of grating couplers (i.e., wavelength dispersive element 1107) then diffracts the respective N number of object beams (coming from the outputs of the beam directing device 1106) along an angle of a first axis 1195 and out of the LIDAR system 1100 (in this example, out of the page). The N number of object beams may then impinge upon an object and reflect back to one of plurality of grating couplers of the receiving array 1108. The plurality of grating couplers of the receiving array 1108 may then direct a specific reflected N number object beams toward one of the detectors of the detector array 1103. Each detector of the detector array may then compare a specific reference beam to a respective one of the N number of reflected object beams. In this way, the plurality of waveguide grating couplers of the wavelength dispersive element 1107 guide one of the N number of object beams to scan along the first axis 1195 as the frequency changes of the one of the N number of object beams. Additionally, the distance between each of the outputs of the beam directing device 1106 allow for a comprehensive scan to take place along the second axis 1196. That is, in one sweep of the light source 1102, the LIDAR system can scan and receive information of the exterior environment in two dimensions (e.g., relative to the first axis 1195 and 1196). The received information (e.g., the reflected N number of object beams) can then be used to determine distance (based on time) and movement (based on frequency modulation, or measuring Doppler effect).

In an embodiment, the plurality of waveguide grating couplers of the beam directing device 1106 and the plurality of waveguide grating couplers of the receiving array 1108 are axis aligned to the first axis. Further, the plurality of waveguide grating couplers of the receiving array 1108 are aligned along an axis 1198 that is parallel to a second axis 1196. Moreover, the waveguide couplers of the beam splitting device are aligned along an axis 1197 that is parallel to a second axis 1196. In an embodiment, each of the plurality of waveguide grating couplers of the beam directing device 1106 is aligned parallel to the first axis 1195 with one of the waveguide couplers of the receiving array 1108.

Figure 12:
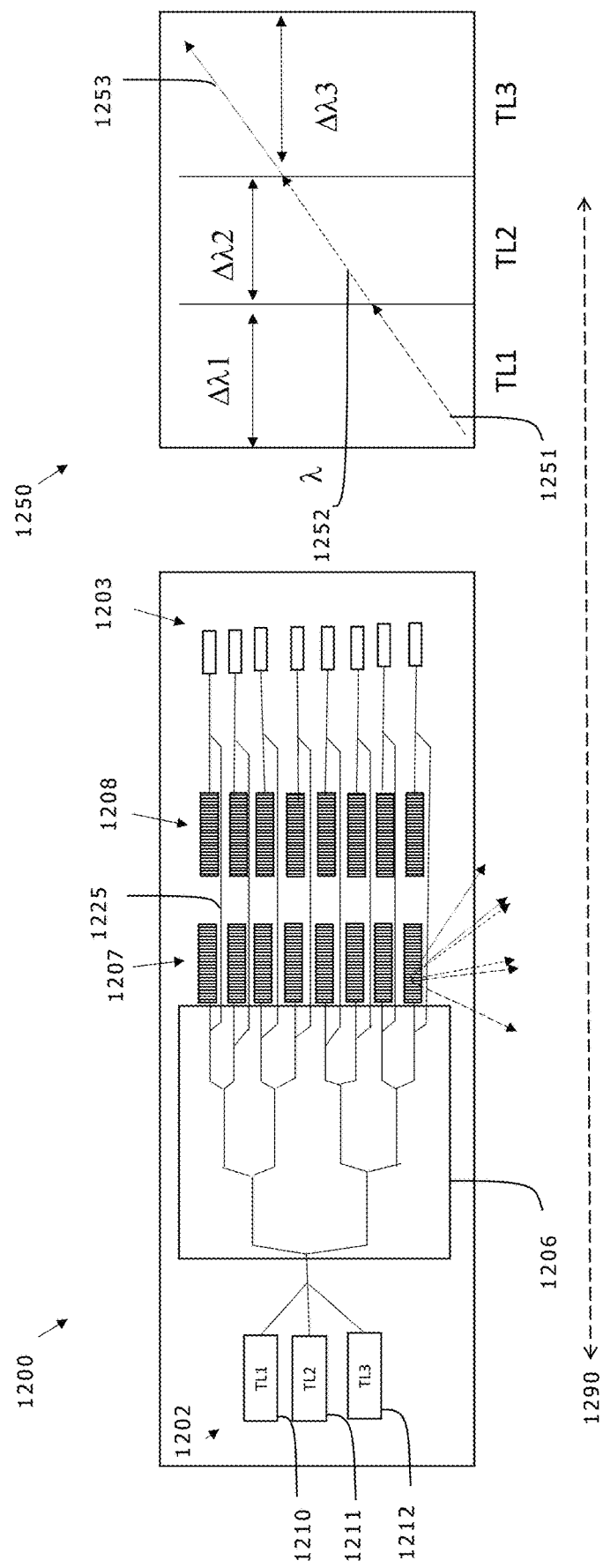
FIG. 12 depicts a fourth example of LIDAR sensing system in accordance with an illustrative embodiment.

FIG. 12 depicts a fourth example of LIDAR sensing system 1200 in accordance with an illustrative embodiment. The LIDAR sensing system 1200 includes a light source 1202, a detector array 1203, a computing device (not depicted), a beam directing device 1206, a wavelength dispersive element 1207, and a receiving array 1208. The light source 1202 includes a first tunable laser 1210, a second tunable laser 1211, and a third tunable laser 1212. The first, second, and third tunable lasers 1210, 1211, and 1212 are cascaded such that each one is connected to an input of the beam directing device 1206. The cascaded first, second, and third tunable lasers 1210, 1211, and 1212 allow for a larger range of wavelength outputs, and as a result, a larger field of view in along the first axis 1290. For example, a chart 1250 depicts the output cascaded light source 1202. In a first portion 1251, the first tunable laser 1210 sweeps from a first wavelength to a second wavelength. In a second portion 1252, the second tunable laser 1211 sweeps from the second wavelength to a third wavelength. In a third portion 1253, the third tunable laser 1212 sweeps from the third wavelength to a last wavelength. In this way, normal restrictions of bandwidth of tunable lasers may be overcome in order to allow for a wider sweeping angle along the first axis 1290. The LIDAR sensing system 1200 also includes an extra output from the beam directing device 1206 that is connected to the receiving array 1208 and serves as a reference path 1225 for each diffraction grating of the wavelength dispersive element 1207. The light source 1202 sweeps linearly and constantly from the first wavelength (i.e., the corresponding first frequency) to the last wavelength (e.g., the corresponding last frequency).

Figure 13A:
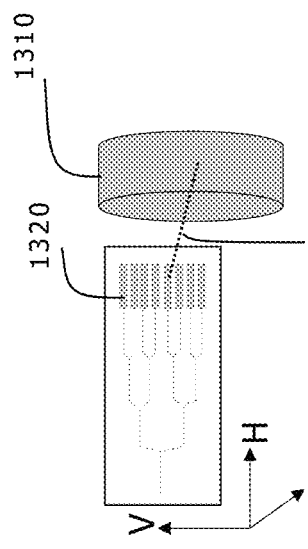
FIG. 13a-13c depict optical path examples of a LIDAR sensing system accordance with an illustrative embodiment.
Figure 13B:
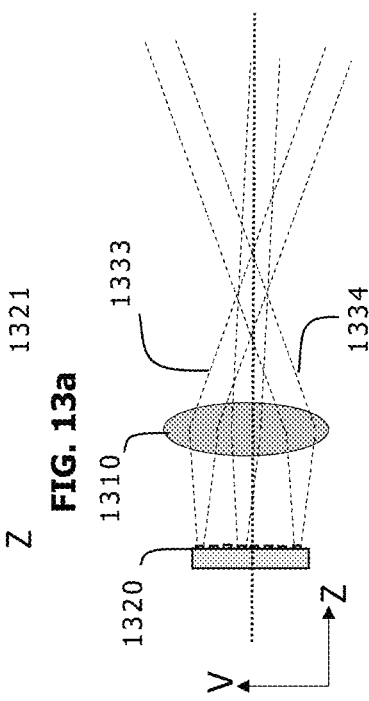
Figure 13C:
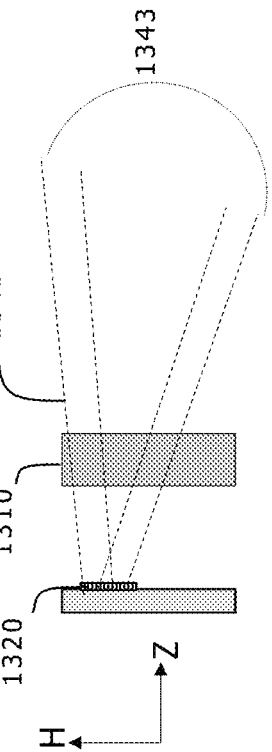

FIG. 13a-13c depict optical path examples of a LIDAR sensing system 600 accordance with an illustrative embodiment. FIG. 13a depicts a LIDAR sensing system with a projection device 1310. The projection device 1311 may be a cylindrical lens, projection lens, or any other optical refraction device that may expand a field of view. The projection device 1310 may be positioned in front of a wavelength dispersive element 1320 such that a centerline axis 1321 of the wavelength dispersive element 1310 is aligned with the center of the projection device 1310 (e.g., an optical axis of a cylindrical lens). In an embodiment, the projection device 1310 refracts (e.g., changes) the angle of an optical beam along a second axis (e.g., the V axis). Further, the projection device 1310 may simply allow the wavelength dispersive element 1310 to project and scan along a first axis (e.g., the H axis) without refracting the angle of the beam in the first axis. The projection device 1310 may be integrated into the LIDAR sensing system 1300 and function as an aperture. The projection device 1310 may be positioned any distance from the wavelength dispersive element 1310 that allows for the desired optical features.

FIG. 13b depicts an side-view of the wavelength dispersive element 1320 with a plurality of diffraction gratings and side-view of the projection device 1310. In an example, an object beam 1333 that is diffracted from the uppermost diffraction grating is projected into the projection device 1310 and the projection device 1310 changes the angle of the object beam 1333. Similarly, a second object beam 1334 that is diffracted from the lowermost diffraction grating is projected into the projection device 1310 and the projection device 1310 changes the angle of the second object beam 1334. In this way, a larger field of view may be achieved in the second axis (e.g., the V axis). In an example, the angle α of the second object beam relative to the second axis can be calculated according to equation (5):

$$\text{Angle } \alpha = \alpha * \tan f/y(i) \quad \quad v(5)$$

where y(i) is the distance of a grating to the optical axis, a is a static coefficient, and f is the focal point distance of the cylindrical lens. That is, the distance that each of the diffraction gratings are from the optical axis correlate to the angle that the object beam will be diffracted in the second axis (e.g., correlated to the field of view achieved by the LIDAR system).

FIG. 13c depicts a top view of the wavelength dispersive element 1320 with one of the diffraction gratings visible and a top view of the projection device 1310 (e.g., the cylindrical lens). The one diffraction grating diffracts an object beam 1341 over a range of angles (depending upon the object beams wavelength) into the projection device 1310. The projection device 1310 does not refract or change the angle of the object beam 1341. In alternative embodiments, the projection device 1310 may refract the angle of the object beam 1341 in the first axis (e.g., the H axis) to achieve a smaller or larger field of view.

Figure 14:
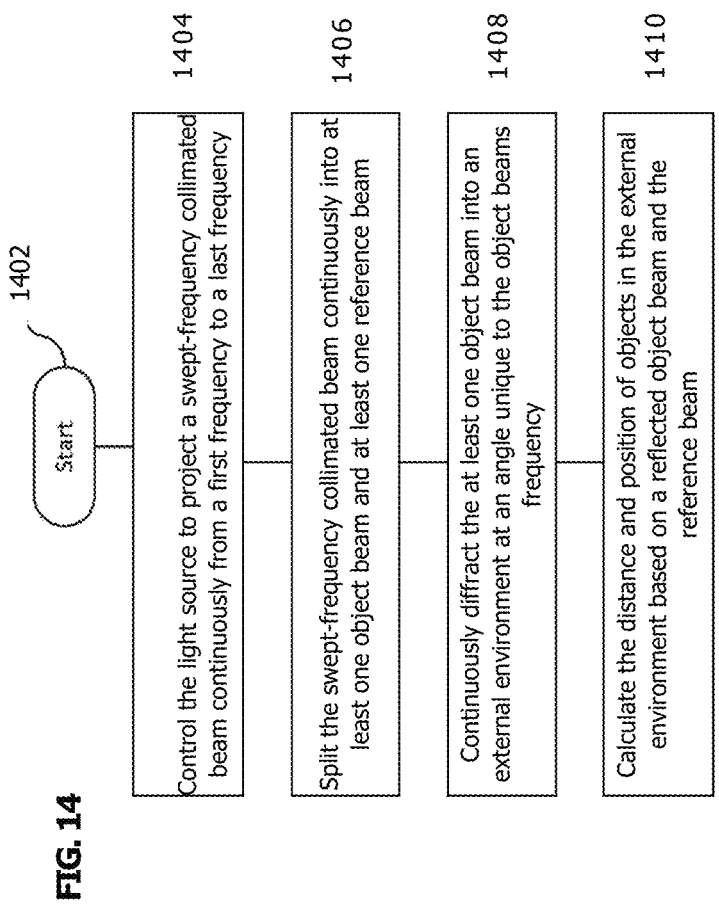
FIG. 14 depicts a flow chart showing an example method of LIDAR sensing in accordance with an illustrative embodiment.

FIG. 14 depicts a flow chart showing an example method of LIDAR sensing 1400 in accordance with an illustrative embodiment. At operation 1402, the method 1400 may begin. For example, the method 700 may begin when an initialization signal (e.g., from a user) is received by the various components/systems described herein. As another example, the method 1400 may begin when a vehicle is started (e.g., when the LIDAR sensing system 100 is a component of the vehicle). The method 1400 may proceed to operation 704.

In an operation 1404, a light source is controlled to project a swept-frequency collimated beam that is continuously swept from a first frequency (i.e., first wavelength) to a last frequency (i.e., last wavelength). The projected swept-frequency collimated beam is directed (e.g., projected, or guided via fiber optics or waveguides) toward a wavelength dispersive element. In an embodiment, the light source may include a plurality of lasers in order to extend the range between the first frequency and the last frequency. In one embodiment, the light source has a means to collimate the swept-frequency collimated beam before it is directed toward the wavelength dispersive element. In alternative embodiments, an external device or collimated lens is used to collimate the swept-frequency collimated beam.

In an operation 1406, the swept-frequency collimated beam is split into a reference beam and an object beam. In some embodiments, the swept-frequency collimated beam is split by a beam splitting device. The beam splitting device may be a waveguide coupler, an interferometer, or other known device. The reference beam is then directed toward a detector (e.g., via a waveguide, fiber optic, or other translucent means). The reference beam may be directed into a recombining device before the reference beam reaches the detector. The recombining means combines a reflected portion of the object beam with the reference beam. The combined reflected portion of the object beam and reference beam may create an interference beam. The recombining means may be any device or structure known in the art that combines two optical beams into one.

In an operation 1408, the object beam is directed onto the wavelength dispersive element and diffracted into an external environment. The wavelength dispersive element may be a diffraction grating or similar device, or the wavelength dispersive element may be a plurality of diffraction gratings or similar devices. In an embodiment, the plurality of diffraction gratings may be integrated onto an optical waveguide, known as a grating coupler. The object beam is directed onto the wavelength dispersive element and the wavelength dispersive element diffracts the object beam into the external environment at an angle relative to a first axis that is unique to the frequency of the swept-frequency collimated beam (and thereby the object beam). That is, the object beam is diffracted from the wavelength dispersive element at continuously-swept diffraction angles as the frequency of the swept-frequency collimated beam is swept from a first diffraction angle, when the collimated beam is projected at the first frequency, to a last diffraction angle when the collimated beam is projected at the last frequency. The first diffraction angle and the last diffraction angle define a field of view along a first axis in a same plane. The diffracted object beam then enters the external environment and is reflected off of any object(s) within the field of view. The reflected object beam is then received by a receiving device (or array) and directed toward the detector.

In an operation 1410, the reference beam and the reflected object beam used to continuously calculate the distances associated with object(s) located within the field of view based on interference patterns generated based on 1) reflected object beam and 2) the reference beam reflected off a reference mirror. A frequency counter may be included with the detector to count and compute the beat frequency. The beat frequency may then be used to accurately calculate the distance of the object(s). In alternative embodiments, other means of calculating (based on the reflected object beam and the reference beam) may be used to continuously calculate the distance and position of the objects.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions.

Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which may of course vary.

It is also to be understood that the terminology used herein is for the purpose of describing particular embodiments only, and is not intended to be limiting.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety.

Definitions that are contained in text incorporated by reference are excluded to the extent that they contradict definitions in this disclosure.

Other embodiments are set forth in the following claims.

What is claimed is:

1. A LIDAR sensing system, comprising:
   a light source arranged to project a collimated beam along a path, the light source configured to continuously sweep the projected collimated beam across frequencies from a first frequency to a last frequency;
   a beam splitting device that splits the collimated beam into 1) a reference beam and 2) an object beam that is directed into an external environment of the LIDAR sensing system;
   a wavelength dispersive element arranged along the path of the object beam, the wavelength dispersive element configured to project the object beam into the external environment at a plurality of diffraction angles relative to a first axis based on the frequency of the collimated beam, wherein each frequency of the collimated beam corresponds to one of the plurality of diffraction angles; and
   a detector system that is configured to continuously detect, over the frequencies from the first frequency to the last frequency, interference patterns generated by the beam splitting device and corresponding to 1) light reflected off objects located in the external environment and 2) the reference beam.

2. The LIDAR sensing system of claim 1, further comprising a beam directing device, wherein the beam directing device is arranged along the path of the object beam configured to direct the object beam along a plurality of angles along a second axis, wherein the first axis is perpendicular to the second axis.

3. The LIDAR sensing system of claim 2, the beam directing device comprising:
   a mirror arranged along the path of the optical beam before the wavelength dispersive element, wherein the beam splitting device is an interferometer; and
   an actuator operatively connected to the mirror and configured to rotate the mirror, wherein the rotation of the mirror reflects the optical beam toward the wavelength dispersive element along the plurality of angles in the second axis.

4. The LIDAR sensing system of claim 2, the beam directing device comprising:
   a 1xN optical switch comprising an input and N outputs, wherein the input receives the collimated beam and the 1xN switch selectively outputs the collimated beam to one or more of the N outputs, and wherein the N outputs are aligned parallel to the second axis; and
   a projection lens configured to receive the collimated beam from the 1xN switch and refract the collimated beam toward the wavelength dispersive element along the plurality of angles in the second axis.

5. The LIDAR sensing system of claim 2, the beam directing device comprising:
   a 1xN optical coupler comprising an input and N outputs, wherein the input receives the collimated beam and the 1xN coupler outputs a portion of the collimated beam to each of the N outputs, and wherein the N outputs are aligned parallel to the second axis; and
   wherein the wavelength dispersive element comprises N grating couplers, wherein each one of the N grating couplers receives the portion of the collimated beam from one of the N outputs, and wherein the N grating couples are aligned in parallel to the second axis.

6. The LIDAR sensing system of claim 5, wherein the N grating couplers are integrated into the 1xN optical coupler.

7. The LIDAR sensing system of claim 5, the detector system further comprising N receiving grating couplers and N detectors, wherein each of the N receiving grating couplers receives light reflected off one or more objects in the external environment and directs the light reflected off the one or more objects in the external environment to one of the N detectors.

8. The LIDAR sensing system of claim 7, wherein the N detectors each receive a portion of the collimated beam via a respective waveguide coupler from the 1xN optical coupler to serve as the reference beam.

9. The LIDAR sensing system of claim 7, wherein the N receiving grating couplers are aligned parallel to the second axis.

10. The LIDAR sensing system of claim 9, wherein the each of the N receiving grating couplers are aligned to one of the N grating couplers along an axis that is parallel to the first axis.

11. The LIDAR sensing system of claim 10, further comprising a projection lens disposed between the wavelength dispersive element and the external environment and configured to refract the collimated beam toward the external environment along the plurality of angles in the second axis.

12. The LIDAR sensing system of claim 1, the light source comprising a first tunable laser, a second tunable laser, and a third tunable laser, wherein the first tunable laser has a first tunable spectrum, the second tunable laser has a second tunable spectrum different from the first tunable spectrum, and the third laser has a third tunable spectrum different from both the first and second tunable spectrums.

13. The LIDAR sensing system of claim 12, wherein the first tunable laser, the second tunable laser, and the third tunable laser are cascaded together and share an optical output.

14. A method of LIDAR sensing, the method comprising:
controlling a light source to project a swept-frequency collimated beam that is continuously swept from a first frequency to a last frequency, the swept-frequency collimated beam being projected towards a wavelength dispersive element;
splitting, via a beam splitting device, the swept-frequency collimated beam into a reference beam and an object beam;
diffracting, via the wavelength dispersive element, the object beam into the external environment at one of multiple diffraction angles according to the frequency of the swept-frequency collimated beam, wherein the object beam is diffracted from the wavelength dispersive element at continuously-swept diffraction angles as the frequency of the swept-frequency collimated beam is swept from a first diffraction angle, when the collimated beam is projected at the first frequency, to a last diffraction angle when the collimated beam is projected at the last frequency, wherein the first diffraction angle and the last diffraction angle define a field of view along a first axis; and
continuously calculating distances associated with objects located within the field of view based on interference patterns generated based on 1) light corresponding to the object beam being reflected off objects in the external environment and 2) the reference beam reflected off a reference mirror.

15. The method of claim 14, further comprising:
adjusting the field of view along a second axis, wherein the first axis is perpendicular to the second axis.

16. The method of claim 15, the adjusting the field of view along a second axis comprising:
reflecting, via a rotatable mirror, the object beam towards the wavelength dispersive element; and
rotating the rotatable mirror from a first position to a second position, wherein the first position reflects the object beam along a first angle on the second axis and the second position reflects the object beam along a second angle on the second axis.

17. The method of claim 15, the adjusting the field of view along a second axis comprising:
selecting a first output of a 1xN output switch, wherein the 1xN output switch comprises N outputs that are aligned parallel to the second axis; and
selecting a second output of the 1xN output switch, wherein the first output switch projects the object beam along a first angle on the second axis and the second output projects the object beam along a second angle on the second axis.

18. The method of claim 15, further comprising:
splitting, via a 1xN optical coupler, the swept-frequency collimated beam into N swept-frequency collimated beams;
splitting each of the N swept-frequency collimated beams into N object beams and N reference beams;
diffracting, via N grating couplers of the wavelength dispersive element, each of the N swept-frequency object beams, wherein the each of the N object beams are swept from the first diffraction angle to the last diffraction angle;
detecting, via N receiving grating couplers, the light corresponding to the N object beams being reflected off objects in the external environment; and
combining each of the N object beams being reflected with one of the N reference beams to create an N number of interference beams.

19. The method of claim 18, further comprising:
refracting, via projection system, each of the N object beams along N refraction angles relative to the second axis, wherein the extremes of the refraction angles of the N object beams define the second field of view; and
calculating, continuously, based on the N interference beams the distance of objects in the external environment that are within a three-dimensional field of view.

20. The method of claim 18, further comprising calculating, continuously, based on the N interference beams the distance of objects in the external environment that are within a three-dimensional field of view, wherein the three-dimensional field of view is defined by the field of view on the first axis and the second field of view on the second axis.

* * * * *